(12) United States Patent
Yin et al.

(10) Patent No.: US 11,828,620 B2
(45) Date of Patent: Nov. 28, 2023

(54) METHOD OF PREDICTING ROAD ATTRIBUTES, DATA PROCESSING SYSTEM AND COMPUTER EXECUTABLE CODE

(71) Applicant: GRABTAXI HOLDINGS PTE. LTD., Singapore (SG)

(72) Inventors: Yifang Yin, Singapore (SG); Jagannadan Varadarajan, Singapore (SG); Roger Zimmermann, Singapore (SG); Wenmiao Hu, Singapore (SG); An Tran, Singapore (SG); Guanfeng Wang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/012,130

(22) PCT Filed: Aug. 3, 2021

(86) PCT No.: PCT/SG2021/050449
§ 371 (c)(1),
(2) Date: Dec. 21, 2022

(87) PCT Pub. No.: WO2022/031228
PCT Pub. Date: Feb. 10, 2022

(65) Prior Publication Data
US 2023/0266144 A1    Aug. 24, 2023

(30) Foreign Application Priority Data
Aug. 7, 2020   (SG) ........................... 10202007603V

(51) Int. Cl.
*G01C 21/36* (2006.01)
*G01C 21/00* (2006.01)
(Continued)

(52) U.S. Cl.
CPC ....... *G01C 21/3852* (2020.08); *G06V 10/803* (2022.01); *G06V 10/82* (2022.01); *G06V 20/13* (2022.01); *G06V 20/182* (2022.01)

(58) Field of Classification Search
CPC .. G01C 21/3852; G06V 10/803; G06V 10/82; G06V 20/13; G06V 20/182;
(Continued)

(56) References Cited

U.S. PATENT DOCUMENTS 8,422,736 B2   4/2013   Kmiecik et al.
8,909,463 B2   12/2014  Chapman et al.
(Continued)

FOREIGN PATENT DOCUMENTS

CN   108009524   5/2018
CN   111209780   5/2020

OTHER PUBLICATIONS

Written Opinion for Application No. PCT/SG2021/060449, dated Sep. 1, 2021 (5 pages).
(Continued)

*Primary Examiner* — Kenneth J Malkowski
(74) *Attorney, Agent, or Firm* — Buckley, Maschoff & Talwalkar LLC

(57) ABSTRACT

A method of predicting one or more road segment attributes corresponding to a road segment in a geographical area, the method including: providing trajectory data and satellite image of the geographical area; calculating one or more image channels based on the trajectory data; and using at least one processor, classifying the road segment based on the one or more image channels and the satellite image using a trained classifier into prediction probabilities of the road attributes A data processing system including one or more processors configured to carry out a the method of predicting road attributes. A computer executable code including
(Continued)

instructions for predicting one or more road segment attributes according to the method.

19 Claims, 17 Drawing Sheets

(51) Int. Cl.
    *G06V 20/10*     (2022.01)
    *G06V 10/82*     (2022.01)
    *G06V 10/80*     (2022.01)
    *G06V 20/13*     (2022.01)

(58) Field of Classification Search
    CPC .... G06V 20/588; G06V 20/582; G06F 16/29; G06F 16/23; G05D 1/0274; G05D 2201/0213; G06N 3/08; G06N 20/00; G06T 7/32
    See application file for complete search history.

(56) References Cited

U.S. PATENT DOCUMENTS

| | | |
|---|---|---|
| 9,355,321 B2 | 5/2016 | Wujeicki |
| 9,401,028 B2 | 7/2016 | Kuehnle et al. |
| 10,635,904 B1 | 4/2020 | Adler |
| 2017/0116477 A1 | 4/2017 | Chen et al. |
| 2019/0385010 A1 | 12/2019 | Pylvaenaeinen et al. |
| 2020/0062264 A1 | 2/2020 | Stein et al. |
| 2020/0193157 A1 | 6/2020 | Soni |

OTHER PUBLICATIONS

Internatioanl Search Report for PCT/SG2021/050449, dated Sep. 1, 2021 (3 pages).

International Preliminary Report on Patentability for App. No. PCT/SG2021/050449, dated Jun. 14, 2022 (21 pages).

| Dataset | One/Two Way | No. of Lanes | Speed Limit | Road Type |
|---|---|---|---|---|
| Singapore | 15049/3763 | 10413/2667 | 7553/1923 | 13556/3388 |
| Jakarta | 5398/1350 | 3404/881 | - | 4171/1017 |

FIG. 15

(a) Singapore

| Classifier | One/Two Way | No. of Lanes | Speed Limit | Road Type |
|---|---|---|---|---|
| Satellite | 0.7778 | 0.6430 | 0.7374 | 0.6942 |
| GPS | 0.8198 | 0.6678 | 0.7722 | 0.6671 |
| Early Fusion | 0.8488 | 0.6967 | 0.8045 | 0.7624 |
| Late Fusion - FC1 | 0.8257 | 0.6937 | 0.8066 | 0.7559 |
| Late Fusion - FC2 | 0.8265 | 0.6937 | 0.8040 | 0.7517 |

(b) Jakarta

| Classifier | One/Two Way | No. of Lanes | Road Type |
|---|---|---|---|
| Satellite | 0.8200 | 0.6288 | 0.6411 |
| GPS | 0.8089 | 0.5970 | 0.6332 |
| Early Fusion | 0.8289 | 0.6470 | 0.7178 |
| Late Fusion - FC1 | 0.8370 | 0.6468 | 0.6873 |
| Late Fusion - FC2 | 0.8326 | 0.6458 | 0.6902 |

FIG. 16

|  | residential | service | primary | secondary | tertiary | footway |
|---|---|---|---|---|---|---|
| residential | 0.89 | 0.06 | 0.01 | 0.01 | 0.02 | 0.01 |
| service | 0.11 | 0.73 | 0.09 | 0.02 | 0.02 | 0.02 |
| primary | 0.06 | 0.25 | 0.57 | 0.02 | 0.01 | 0.08 |
| secondary | 0.06 | 0.16 | 0.12 | 0.53 | 0.1 | 0.02 |
| tertiary | 0.37 | 0.14 | 0.05 | 0.03 | 0.38 | 0.03 |
| footway | 0.06 | 0.24 | 0.22 | 0.08 | 0.08 | 0.31 |

True label / Predicted label

FIG. 19C

| Sensor Data | Bin No. | Singapore | | | | Jakarta | | |
|---|---|---|---|---|---|---|---|---|
| | | One/Two Way | No. of Lanes | Speed Limit | Road Type | One/Two Way | No. of Lanes | Road Type |
| GPS | | 0.7736 | 0.6393 | 0.6828 | 0.6012 | 0.7933 | 0.5800 | 0.6185 |
| Bearing | 3 | 0.8129 | 0.6423 | 0.7431 | 0.6281 | 0.8081 | 0.5823 | 0.6214 |
| Bearing | 7 | 0.8134 | 0.6562 | 0.7546 | 0.6420 | 0.8059 | 0.5845 | 0.6352 |
| Speed | 3 | 0.7962 | 0.6475 | 0.7249 | 0.6434 | 0.7844 | 0.5664 | 0.6155 |
| Speed | 7 | 0.7914 | 0.6490 | 0.7421 | 0.6600 | 0.7956 | 0.5834 | 0.6185 |
| GPS+B.+S. | 1+3+3 | 0.8198 | 0.6678 | 0.7722 | 0.6671 | 0.8089 | 0.5970 | 0.6332 |

FIG. 20

| Kernel Size | Singapore | | | | Jakarta | | |
|---|---|---|---|---|---|---|---|
| | One/Two Way | No. of Lanes | Speed Limit | Road Type | One/Two Way | No. of Lanes | Road Type |
| 1 × 1 | 0.7853 | 0.6123 | 0.6417 | 0.5962 | 0.7837 | 0.5619 | 0.5929 |
| 3 × 3 | 0.8023 | 0.6457 | 0.7067 | 0.6346 | 0.7941 | 0.5709 | 0.6028 |
| 5 × 5 | 0.8087 | 0.6494 | 0.7343 | 0.6479 | 0.7948 | 0.5811 | 0.6205 |
| 7 × 7 | 0.8177 | 0.6530 | 0.7540 | 0.6588 | 0.8059 | 0.5800 | 0.6224 |
| 9 × 9 | 0.8198 | 0.6678 | 0.7722 | 0.6671 | 0.8089 | 0.5970 | 0.6332 |
| 11 × 11 | 0.8222 | 0.6599 | 0.7618 | 0.6741 | 0.8096 | 0.5959 | 0.6293 |

Table 4: Road attribute detection based on GPS traces smoothed using kernels of different sizes.

FIG. 21

| Input | Size | Method | One/Two Way | No. of Lanes | Speed Limit | Road Type |
|---|---|---|---|---|---|---|
| Satellite | 224 × 224 | AlexNet [19] | 0.7436 | 0.6033 | 0.7276 | 0.6340 |
| | | MobileNet [15] | 0.7526 | 0.6265 | 0.7135 | 0.7178 |
| | | DenseNet [16] | 0.7640 | 0.6524 | 0.7410 | 0.7128 |
| | | Ours | 0.7778 | 0.6430 | 0.7374 | 0.6942 |
| GPS | 224 × 224 | AlexNet [19] | 0.8145 | 0.6487 | 0.6937 | 0.6502 |
| | | MobileNet [15] | 0.8124 | 0.6517 | 0.7119 | 0.6564 |
| | | DenseNet [16] | 0.8193 | 0.6633 | 0.7238 | 0.6727 |
| | | Ours | 0.8198 | 0.6678 | 0.7722 | 0.6671 |
| Fusion | 224 × 224 | AlexNet [19] | 0.8299 | 0.6610 | 0.7473 | 0.7308 |
| | | MobileNet [15] | 0.8307 | 0.6742 | 0.8008 | 0.7651 |
| | | DenseNet [16] | 0.8366 | 0.6775 | 0.7982 | 0.7659 |
| | | Ours | 0.8488 | 0.6967 | 0.8045 | 0.7624 |

FIG. 22

| Calibration | Method | One/Two Way | Gain | No. of Lanes | Gain | Speed Limit | Gain | Road Type | Gain |
|---|---|---|---|---|---|---|---|---|---|
| - image rotation | AlexNet [19] | 0.8456 | 1.9% | 0.7019 | 6.2% | 0.7509 | 0.5% | 0.7373 | 0.9% |
| | MobileNet [15] | 0.8666 | 4.3% | 0.7229 | 7.2% | 0.7826 | - | 0.7972 | 4.2% |
| | DenseNet [16] | 0.8538 | 2.1% | 0.7289 | 7.6% | 0.7956 | - | 0.7952 | 3.8% |
| | Ours | 0.8669 | 2.1% | 0.7225 | 3.7% | 0.7972 | - | 0.7831 | 3.4% |
| - bearing adjustment | AlexNet [19] | 0.8411 | 1.3% | 0.6337 | - | 0.6984 | - | 0.7470 | 2.2% |
| | MobileNet [15] | 0.8469 | 2.0% | 0.6625 | - | 0.7754 | - | 0.8076 | 5.6% |
| | DenseNet [16] | 0.8576 | 2.5% | 0.6757 | - | 0.8060 | 1.0% | 0.8200 | 7.1% |
| | Ours | 0.8738 | 2.9% | 0.7019 | 0.7% | 0.8300 | 3.2% | 0.8070 | 5.8% |
| - image rotation & bearing adjustment | AlexNet [19] | 0.8836 | 6.5% | 0.7278 | 10.1% | 0.7353 | - | 0.7211 | - |
| | MobileNet [15] | 0.8937 | 7.6% | 0.7402 | 9.8% | 0.7852 | - | 0.8117 | 6.1% |
| | DenseNet [16] | 0.9091 | 8.7% | 0.7413 | 9.4% | 0.7894 | - | 0.7869 | 2.7% |
| | Ours | 0.9059 | 6.7% | 0.7447 | 6.9% | 0.7795 | - | 0.7834 | 2.8% |

FIG. 23

METHOD OF PREDICTING ROAD ATTRIBUTES, DATA PROCESSING SYSTEM AND COMPUTER EXECUTABLE CODE

TECHNICAL FIELD

An aspect of the disclosure relates to a method of predicting one or more road segment attributes corresponding to a road segment in a geographical area. Another aspect of the disclosure relates to a data processing system. Another aspect of the disclosure relates to a non-transitory computer-readable medium storing computer executable code. Another aspect of the disclosure relates to a computer executable code. Another aspect of the disclosure relates to a method for training an automated road attribute predictor.

BACKGROUND

The service of ride-hailing providers significantly relies on the quality of a digital map. Incomplete satellite image such as a missing road or even a missing road attribute can lead to misleading routing decisions or inaccurate prediction of a driver's arrival time. However, the updating of both commercial and free maps still heavily relies on the manual annotations from human. The high cost results in maps with low completeness and inaccurate outdated data. Taking the OpenStreetMap (OSM) as an example, which provides the community a user-generated map of the world, its data completeness and accuracy vary significantly in different cities. For example, in Singapore, while most of the roads are annotated in the map with the one-way or two-way tags, only about 40% and 9% of the roads are annotated with the number of lanes and the speed limit in the downtown area.

Therefore, current methods of updating satellite image have drawbacks and it is desired to provide for an improved method of updating satellite image.

SUMMARY

An aspect of the disclosure relates to a method of predicting one or more road segment attributes corresponding to a road segment in a geographical area. The method may include providing trajectory data and satellite image of the geographical area. The method may include calculating one or more image channels based on the trajectory data. The method may include, using at least one processor, classifying the road segment based on the one or more image channels and the satellite image using a trained classifier, e.g., into prediction probabilities of the road attributes.

An aspect of the disclosure relates to a data processing system including one or more processors configured to carry out the method of predicting road attributes.

An aspect of the disclosure relates to a data processing system including one or more processors configured to carry out a method of predicting road attributes. The system may include a first memory configured to store trajectory data of the geographical area. The system may include a second memory configured to store a satellite image of the geographical area. The system may include a processor configured to calculate one or more image channels based on the trajectory data. The system may include a classifier, the classifier may include a neural network configured to predict road attributes based on the one or more image channels and the satellite image. The classifier may include an output layer configured to provide the prediction probabilities of the road attributes. The classifier may be a trained classifier.

An aspect of the disclosure relates to a non-transitory computer-readable medium storing computer executable code including instructions for predicting one or more road segment attributes according to the method described herein.

An aspect of the disclosure relates to a computer executable code including instructions for predicting one or more road segment attributes according to the method described herein.

An aspect of the disclosure relates to a method of training an automated road attribute predictor. The method of training may include performing forward propagation by inputting training data into the automated predictor to obtain an output result, for a plurality of road segments of a geographical area. The training data may include trajectory data and satellite image having an electronic image format. The method of training may include performing back propagation according to a difference between the output result and an expected result to adjust weights of the automated predictor. The method of training may include repeating the above steps until a pre-determined convergence threshold may be achieved. The automated predictor may include the classifier configured to be trained to provide the prediction probabilities of the road attributes. The classifier may include a neural network configured to predict road attributes based on one or more image channels and satellite image. The one or more image channels may be calculating based on the trajectory data.

An aspect of the disclosure relates to a classifier trained by the method of training as described herein.

BRIEF DESCRIPTION OF THE DRAWINGS

The invention will be better understood with reference to the detailed description when considered in conjunction with the non-limiting examples and the accompanying drawings, in which:

In FIG. 12A, a satellite image is shown with heavy clouds that interfere with the visibility of the roads. In FIG. 12B, sparse GPS samples makes it more difficult to identify a narrow road;

FIG. 13A shows the rendering of the original GPS traces. FIG. 13B shoes the rendering of the smoothed GPS traces with kernel=3, and FIG. 13C shoes the rendering of the smoothed GPS traces with kernel=5;

FIG. 15 shows the number of training and testing samples used in examples, for in each category (i.e., each road attribute).

FIG. 16 shows a table with results of classification accuracy obtained based on satellite images only, GPS traces only, and their fusion;

FIG. 17A shows the speed limit and FIG. 17B shows the road type for data sample of Singapore;

FIGS. 19A to 19C show confusion matrices of the method of predicting one or more road segment attributes in accordance with various embodiments on: FIG. 19A, the speed limit for Singapore; FIG. 19B, road type detection for Singapore, FIG. 19C, the road type for Jakarta;

FIG. 20 shows a table with the results of a study on the impact of the number of bins/channels $M_b$ and $M_s$, that are used to render the sensor data into images;

FIG. 21 shows a table with the results of a study of the impact of the kernel size adopted for GPS smoothing;

FIG. 22 shows a table reporting the classification accuracy based on different combinations of input modules and model architectures on the Singapore dataset;

FIG. 23 shows a table reporting the classification accuracy and the performance gain of the disclosed multimodal feature fusion with and without calibration.

Figure 1:
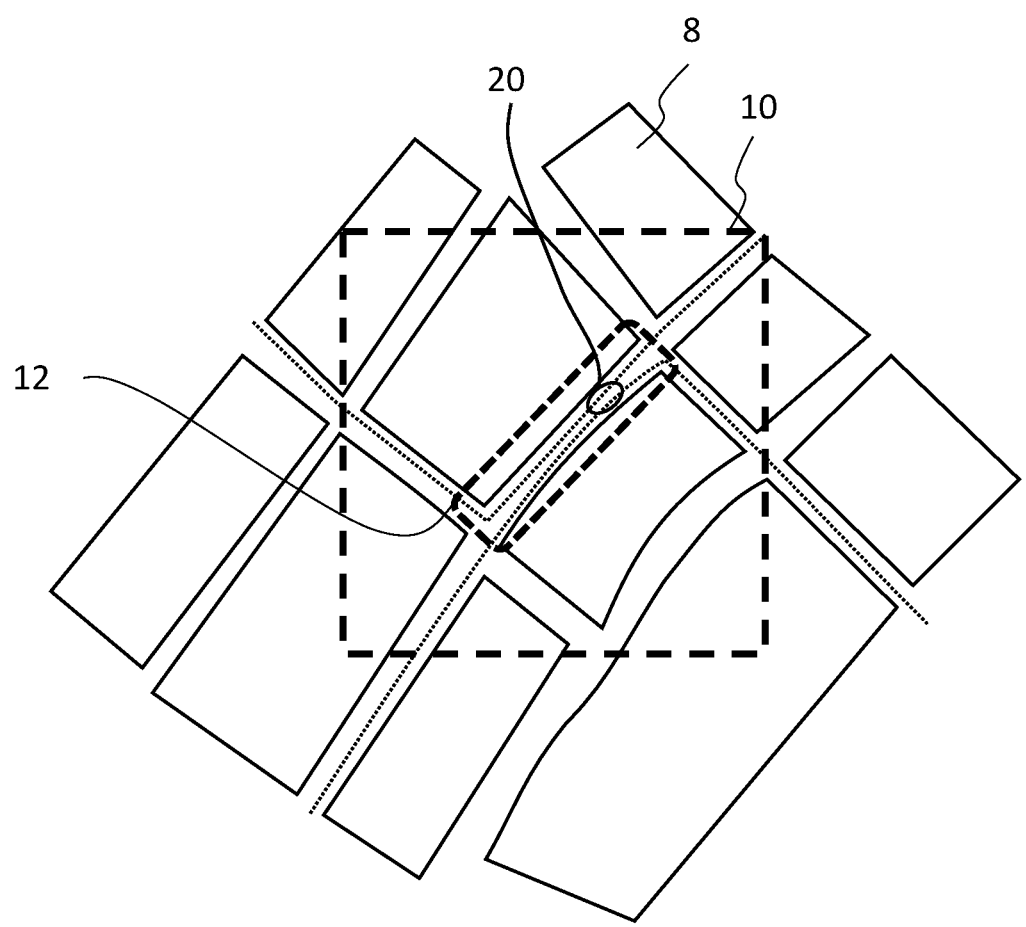
FIG. 1 shows an exemplary map including a geographical area 10 which includes a road segment 12.

A neural network stream, or also named as flow, is represented in the drawings from left to right, and may be indicated by arrows.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the methods for predicting, systems, computer executable codes, non-transitory computer-readable medium, and methods for training, are analogously valid for the other methods for predicting, systems, computer executable codes, non-transitory computer-readable medium, and methods for training. Similarly, embodiments described in the context of a method for predicting are analogously valid for a system, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

As used herein, the method of predicting one or more road segment attributes may be simply referred to as the method, while the method for training a classifier is explicitly named as such.

The term "road" as used herein may mean a way which is envisaged for a vehicle locomotion, and its meaning may include motorway (also known as highway), main road, street, or a combination thereof.

The term "vehicle" may mean a motor vehicle, for example a car, or a bus.

As used herein the terms "detection" and "prediction" may be used interchangeably.

According to various embodiments, road attributes may include, among others, one or more of: one-way/two-way road, number of lanes, speed limit, road type. Examples of road types may include, among others, one or more of: "Residential", "Service", and "Footway", "Primary", "Secondary", "Tertiary".

As used herein the terms "classifier", "neural network", and their variants (e.g. CNN), refer to artificial classifier, artificial neural network, and their variants, respectively, which means that they are computer implemented and are processed by an electronic microprocessor, or simply named herein as "processor". Examples of processor include, among others, CPU, GPU, neural network co-processor, neural-network processor, neural-network chip.

The skilled person in the art would understand, based on the present disclosure, that, in embodiments and examples not related to training, the neural network is a trained neural network, the classifier is a trained classifier, and the automated predictor is a trained automated predictor. For example, an automated predictor may have been trained based on a training data record including (i) training trajectory data of at least one geographical area, the trajectory data including location, bearing and speed, and (ii) training satellite image (i.e., training images) of the at least one sub-area of the geographical area, wherein the training trajectory data or the training satellite images include associated one or more pre-determined road attributes.

According to various embodiments a method of predicting one or more road segment attributes corresponding to a road segment in a geographical area is disclosed herein. The method may include providing trajectory data and satellite image of the geographical area.

As used herein and in accordance with various embodiments, the term trajectory data may include geographical data, such as geospatial coordinate and may further include time, for example, as provided by the global positioning system GPS. Trajectory data may be obtained from the recording of positions of one or more moving vehicles. For example, latitude, longitude and time, the trajectory data may further include elevation. The GPS coordinates may according to the World Geodetic System, WGS 84, for example, version G1674.

According to various embodiments, the trajectory data may include a plurality of data points, wherein each data point may include latitude, longitude, bearing, and speed.

A trajectory trace, e.g., a GPS trace, may be defined to be a sequence of records associated with timestamps. Each record (also named as point) includes location, bearing, and speed returned by sensors. The location of a trajectory record may be represented by the latitude and longitude pair. The bearing is the clock-wise angle of the device's moving direction with respect to the earth's true north direction.

For the identification of road attributes, the location data may be real world data, for example real world GPS data. Correspondingly, the geographical area represents an area on earth's surface.

As used herein and in accordance with various embodiments, the terms 'geographical' and 'geospatial' may be used interchangeably.

According to various embodiments, the method may include calculating one or more image channels based on the trajectory data.

According to various embodiments, the method steps may be processed on a processor. The method may include, using at least one processor, classifying the road segment based on the one or more image channels and the satellite image using a trained classifier into prediction probabilities of the road attributes.

According to various embodiments, the satellite images may be extracted from larger satellite images, for example, by generating cropped images by cropping images from the larger satellite images. The cropped images may be centered at a corresponding road segment. According to various embodiments, the satellite image data may be, or be obtained from, digital maps, for example existing digital maps. Example of existing digital maps are the maps provided from OpenStreetMap® (www.openstreetmap.org). The digital maps may include rules for the visualization of the geographic objects, for example including one or more of roads, highways, buildings. For example, each of the geographical objects and/or each attribute of the geographical objects, may have a different color, a different perimeter line style (e.g. a different line thickness), a different fill pattern, or a combination thereof. A combination of digital maps of different sources, e.g. having different rules of visualization, may also be used as source for the satellite image data. The satellite image may include channels of different color, for example red (R), green (G), and blue (B).

According to various embodiments, trajectory data may be extracted from vehicle trace databases, for example crowdsourced GPS traces. The trajectory data may be identified as a group of points or traces of the trajectory data that are associated with a road segment of the road segments, for example, that is within a geographically defined perimeter which is a same perimeter used for determining the satellite image for the same road segment.

According to various embodiments, the data processing system may include a first memory configured to store trajectory data of the geographical area. The data processing system may include a second memory configured to store satellite image. The satellite image may include image data of the geographical area.

According to various embodiments, the satellite image may be in the form of image data, for example in electronic form configured to be stored in electronic digital format. An example of an electronic digital format for image data is JPEG. The electronic digital form may be, or provide information, to reproduce the image in the form of an array of pixels.

According to various embodiments calculating one or more image channels based on the trajectory data may include at least one of:
i) calculating a trajectory image channel, as part of the one or more image channels, based on the trajectory data;
ii) calculating a bearing image channel, as part of the one or more image channels, based on the trajectory data;
iii) calculating a speed image channel, as part of the one or more image channels, based on the trajectory data.
According to some embodiments, the method may include i), ii), and iii).

According to various embodiments, calculating the trajectory image channel may include assigning a count of the number of trajectory points, e.g. GPS points, of the trajectory data that may be projected onto each pixel of a matrix of pixels. For example, having GP defined to be a single-channel image, a count may be performed on the number of trajectory points that are projected onto each pixel. Therefore, $GL^i$ is updated by $GL^i(x, y, 0) = GL^i(x, y, 0) + 1$ (Eq. 1).

According to various embodiments calculating a bearing image channel may include providing a multichannel bearing image including multichannel pixels, wherein the number of channels represents a number of bearing bins, and quantizing bearing values, e.g., by degree, into the bearing bins forming a bearing histogram for each of the multichannel pixels.

For example, $GB^i$ may be defined to be a $M_b$-channel image where $M_b$ is the number of bins adopted to quantize the bearing values in degree into a histogram at each pixel. Let $Bin_b$ denote the bin size to generate the bearing histogram, $GB^i$ may be updated, given a trajectory point $p_j^i$ with $bearing_j^i$ at (x, y) in the image, as $GB^i(x, y, int(bearing_j^i/Bin_b)) = GB^i(x, y, int(bearing_j^i/Bin_b)) + 1$ (Eq. 2).

According to various embodiments calculating a speed image channel may include providing a multichannel speed image including multichannel pixels, wherein the number of channels represents a number of speed bins, and quantizing speed values [in m/s] into the speed bins forming a speed histogram for each of the multichannel pixels.

For example, $GS^i$ may be defined to be a $M_s$-channel image where $M_s$ is the number of bins adopted to quantize the speed values, e.g., in m/s, into a histogram at each pixel. Let Bins denote the bin size to generate the speed histogram, $GS^i$ may be updated, given a trajectory point pi with speed) at (x, y) in the image, as $GS^i(x, y, int(speed_j^i/Bin_s)) = GS^i(x, y, int(speed_j^i/Bin_s)) + 1$ (Eq. 3).

According to some embodiments, the method may include concatenating the trajectory image channel, the bearing image channel, and the speed image channel into a concatenated trajectory image before classifying the road segment. For example, the concatenated trajectory image is used as input in the classifier. In another example, the concatenated trajectory image fused with the satellite image is used as input in the classifier.

The location $GL^i$, bearing $GB^i$, speed $GS^i$ images form a $(1+M_b+M_s)$-channel image, i.e., the concatenated image, as the image-based feature extracted from the trajectory traces for road segment ($r_i$).

According to various embodiments, the method may further include applying a smoothing filter on the concatenated trajectory image before classifying the road segment. With a high rendering resolution at, the projection of the original trajectory points around a road segment can be noisy and sparse. According to some embodiments, each channel of $G^i$ may be smoothed, e.g., by computing the moving average over a square kernel with size K. Alternative weighting functions such as 2D Gaussian kernel may be adopted. The parameters therein may be tuned based on the characteristics of the trajectory data.

According to various embodiments, the location $GL^i$, bearing $GB^i$, speed $GS^i$ images may be normalized. The distribution of trajectory traces can be unbalanced on different types of roads, e.g., highways and residential roads. To reduce the impact of trajectory traces disparity the location channel may be normalized based on the maximum value over all the pixels, while the bearing and speed channels may be normalized based on the sum over all the respective channels at each pixel. For example, the location $GL^i$, bearing $GB^i$, speed $GS^i$ images may be normalized according to Eq. 4 as follows:

$$GL^i(x, y) = GL^i(x, y)/\max_{\{x',y'\}} GL^i(x', y')$$

$$GB^i(x, y) = GB^i(x, y)/\sum_{c'=0}^{M_b-1} GB^i(x', y', c')$$

$$GS^i(x, y) = GS^i(x, y)/\sum_{c'=0}^{M_s-1} GS^i(x', y', c')$$

to obtain the final trajectory data rendering result $G^i$.

In one example, the pre-possessing algorithm may be summarized as follows:

environments. This is especially helpful for the detection of road attributes such as number of lanes as the road width can be more easily recognized after calibration. However, the detection of some other road attributes such as speed limit and road type may also rely on the features of the surrounding environments, e.g., residential roads are always within residential areas. In some embodiments, only one of the calibration methods may be used, as better results may be obtained in comparison to using both calibration methods, as, in some cases, calibration may weaken the feature consistency of the surrounding environments too much by applying both calibration methods, resulting in less satisfactory detection rates of certain road attributes.

According to various embodiments classifying may include fusing the satellite image and the concatenated trajectory image into a fused image and input the fused image in a neural network stream of the trained classifier. By rendering trajectory traces into a multi-channel image, multimodal fusion can be directly conducted at the input layer by concatenating the channels of the satellite images (e.g., the RGB channels) and the location, bearing, and speed channels generated from the trajectory traces. This fusion strategy has the advantage of being able to learn filters from multimodal features as the satellite images and the trajectory traces are spatially aligned at the same rendering resolution. This strategy is also referred as early fusion in this disclosure.

```
Input: A set of GPS points P^i in the nearby region of a road segment r_i
Output: A multi-channel image G^i as the feature extracted from P^i for road segment r_i
3D Array GL^i, GB^i, GS^i;
/* GL^i, GB^i, and GS^i are the image channels generated based on
    location, bearing, and speed, respectively.                                    */
for each point P_j^i in P^i do
 |  /* P_j^i = (lat_j^i, lon_j^i, bearing_j^i, speed_j^i) is a 4-tuple that contains
 |     the readings of latitude, longitude, bearing, and speed.                    */
 |  x, y=locate_pixel(lat_j^i, lon_j^i, r_i);
 |  update_location_channel(GL^i, x, y) //based on Eq. 1;
 |  update_bearing_channel(GB^i, x, y, bearing_j^i) //based on Eq. 2;
 |  update_speed_channel(GS^i, x, y, speed_j^i) //based on Eq. 3;
G^i=Concat((GL^i, GB^i, GS^i)axis=-1);
kernel_smoothing(G^i) //based on moving average;
normalization(G^i) //based on Eq. 4;
return G^i;
```

According to various embodiments, the method, further including applying image rotation until the road segment in the concatenated trajectory image may be aligned with the road segment in satellite image before classifying the road segment.

According to various embodiments, to reduce the impact of road directions on the extraction of road features, the road features may be calibrated in any or both of the following two aspects. Both the satellite images and the one or more image channels (e.g., the trajectory based multi-channel images location $GL^i$, bearing $GL^i$, speed $GS^i$) may be rotated to ensure that the road direction is always horizontal in the image, this also has the additional benefit of simplifying the computation of bearing. Instead of using the absolute bearing values in the trajectory traces, the angle distance between the moving direction of the vehicle and the direction of road segment $r_i$ may be computed to calculate $GB^i$. This is based on the observation that some road attributes such as the one-way/two-way road can be more correlated with the relative angle rather than the absolute bearing values.

Both calibration methods strengthen the features around the roads while weaken the features of the surrounding In examples, providing trajectory data and satellite image of the geographical area may be carried out by extracting the image-based road features from both satellite images and crowdsourced GPS traces, respectively. The detection of each road attribute may then modeled as an image classification problem, in accordance with various embodiments. For example, a network consisting of five convolutional layers, followed by two fully-connected layers and one output layer may be adopted for the classification. The kernel size may be, e.g., 3 and the number of filters may be set to, e.g., 64, 128, 256, 256, and 256, respectively. A stride of 1 may be adopted in the last three convolutional layers, while a stride of 2 may be adopted in the rest convolutional layers and the max pooling layers. However, the disclosure is not limited thereto.

According to some embodiments the classifier, which may be a trained classifier, may include a trajectory neural network stream. The classifier may include a satellite image neural network stream. The classifier may include a fully connected layer for receiving input from the trajectory neural network stream and the satellite image neural network stream and outputting a fused stream. The classifying may include inputting the concatenated trajectory image into the trajectory neural network stream, and inputting the satellite image in the satellite image neural network stream.

According to some embodiments, the trajectory neural network stream may be configured to process multiple trajectory images of the same geographical area including different times, wherein the multiple trajectory images may include the concatenated trajectory image 34. For example, each image of the multiple trajectory images may have a different timestamp, thus the multiple trajectory images may have a time axis. In examples, the trajectory neural network stream Si may be configured as a Convolutional Recurrent Neural Network CRNN or a 3D Convolutional Neural Network.

According to various embodiments, the classifier may include a Convolutional Neural Network CNN. For example, the CNN may be selected from: a Dense Convolutional Network including a plurality of layers, wherein each layer of the plurality of layers may be feed-forward connected to every other layer (DenseNet); a CNN including a plurality of convolutional layers followed by fully connected layers, wherein pooling of outputs of neighboring groups of neurons may be performed with overlap (AlexNet); a CNN configured to process a plurality of layers via depthwise convolution and pointwise convolution (MobileNet).

According to various embodiments, the trained classifier may include: a first group including 2 first convolutional layers, followed by a second group including 3 second convolutional layers, followed by a max pooling layer, followed by a third group including 2 fully connected layers, followed by an output layer. Each convolutional layer of the first group and the second group may be followed by an activation unit, for example a Rectified Linear Unit (ReLU), which may be followed by a batch normalization layer and a max pool layer. Each fully connected layer of the third group may be followed by a respective activation unit, for example, ReLU. Each convolutional layer of the second group 202 may be followed by an activation unit, for example, ReLU. The output layer may be further processed with softmax pooling layer.

In various embodiments, a ReLU activation function may be used by way of example, however the present disclosure is not limited thereto, and other activation functions may be used instead.

Embodiments relate to a data processing system including one or more processors configured to carry out the method of predicting road attributes.

Embodiments relate to a data processing system including one or more processors configured to carry out a method of predicting road attributes. The method may include a first memory configured to store trajectory data of the geographical area. The method may include a second memory configured to store a satellite image of the geographical area. The method may include a processor configured to calculate one or more image channels based on the trajectory data. The method may include a classifier, which may be a trained classifier, including a neural network configured to predict road attributes based on the one or more image channels and the satellite image; and an output layer configured to provide the prediction probabilities of the road attributes.

According to various embodiments, the system may be configured to concatenate the one or more image channels into a concatenated trajectory image before classifying the road segment.

According to some embodiments, the classifier may be configured to fuse the satellite image and the concatenated trajectory image into a fused image and input the fused image in a neural network stream of the trained classifier, for example, into a single neural network stream of the trained classifier. Accordingly, the classifier may, in some embodiments, have a single neural network stream.

In other embodiments, the classifier, which may be a trained classifier, may include a trajectory neural network stream and a satellite image neural network stream. The classifier may include a fully connected layer for receiving input from the trajectory neural network stream and the satellite image neural network stream and outputting a fused stream. The classifier may be configured to classify when the concatenated trajectory image is input into the trajectory neural network stream, and the satellite image is input in the satellite image neural network stream. The input images may be pre-processed, as disclosed herein.

According to various embodiments, the trajectory neural network stream may be configured to process multiple trajectory images of the same geographical area including different times, wherein the multiple trajectory images may include the concatenated trajectory image. In examples, the trajectory neural network stream may be configured as a Convolutional Recurrent Neural Network or a 3D Convolutional Neural Network.

An aspect of the disclosure relates to a non-transitory computer-readable medium storing computer executable code including instructions for predicting one or more road segment attributes according to the method of predicting one or more road segment attributes.

An aspect of the disclosure relates to a computer executable code including instructions for predicting one or more road segment attributes according to the method of predicting one or more road segment attributes.

An aspect of the disclosure relates to a method of training a classifier or an automated road attribute predictor including the classifier, the method including:
performing forward propagation by inputting training data into the automated predictor to obtain an output result, for a plurality of road segments of a geographical area, wherein the training data may include trajectory data and satellite image having an electronic image format.
performing back propagation according to a difference between the output result and an expected result to adjust weights of the automated predictor; and
repeating the above steps until a pre-determined convergence threshold may be achieved. The automated predictor may include the classifier configured to provide the prediction probabilities of the road attributes. The classifier may include a neural network configured to predict road attributes based on one or more image channels and satellite image. The one or more image channels may be calculating based on the trajectory data. An aspect of the disclosure relates to a classifier trained by the method of training.

Figure 2:
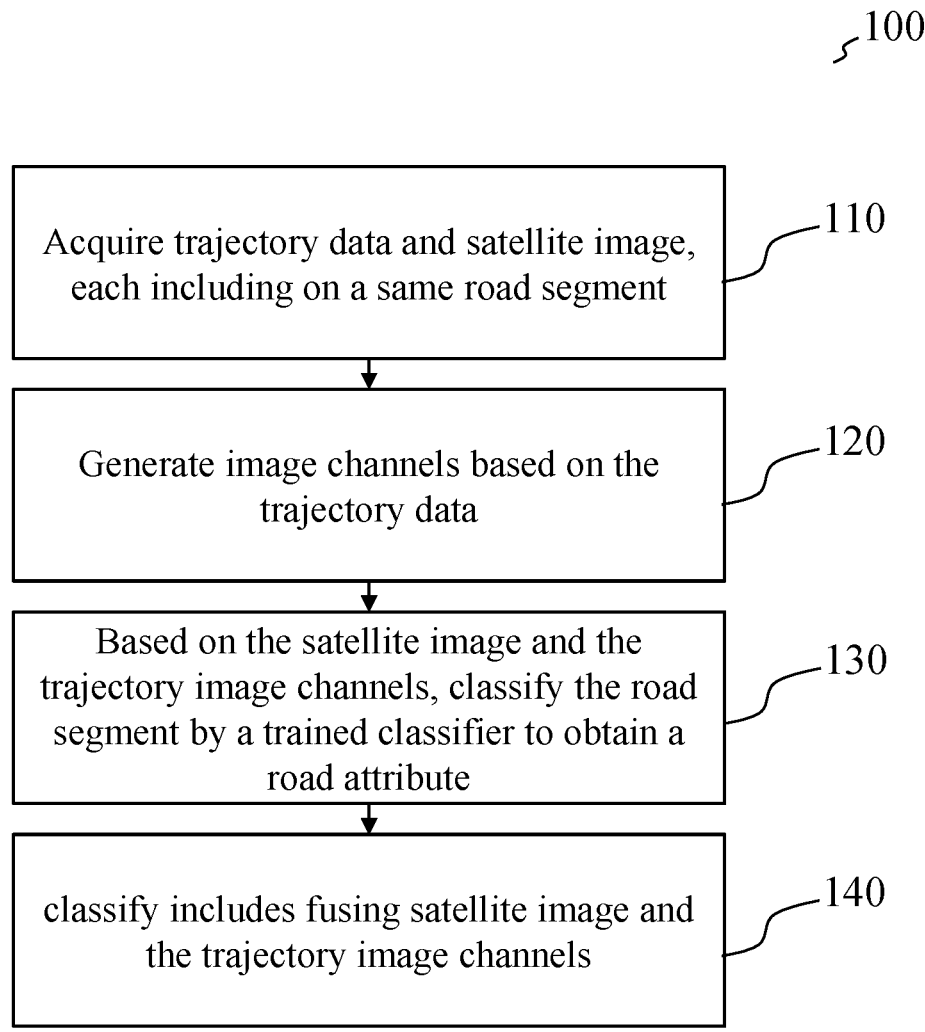
FIG. 2 shows a flow chart of a method 100 of predicting one or more road segment attributes 20 in accordance with various embodiments.

FIG. 1 shows an exemplary map including a geographical area 10 including city blocks 8 (e.g., residential blocks) and road segment 12. FIG. 2 shows a flow chart of a method 100 of predicting one or more road segment attributes 20 in accordance with various embodiments. According to various embodiments, the method 100 of predicting one or more road segment attributes 20 corresponding to a road segment 12 in a geographical area 10, may include:
providing trajectory data 110 and satellite image 40 of the geographical area 10;
calculating one or more image channels 120 based on the trajectory data 30; and using at least one processor, classifying 130 the road segment 12 based on the one or more image channels 32 and the satellite image 40 using a trained classifier 61 into prediction probabilities of the road attributes 20.

Figure 3:
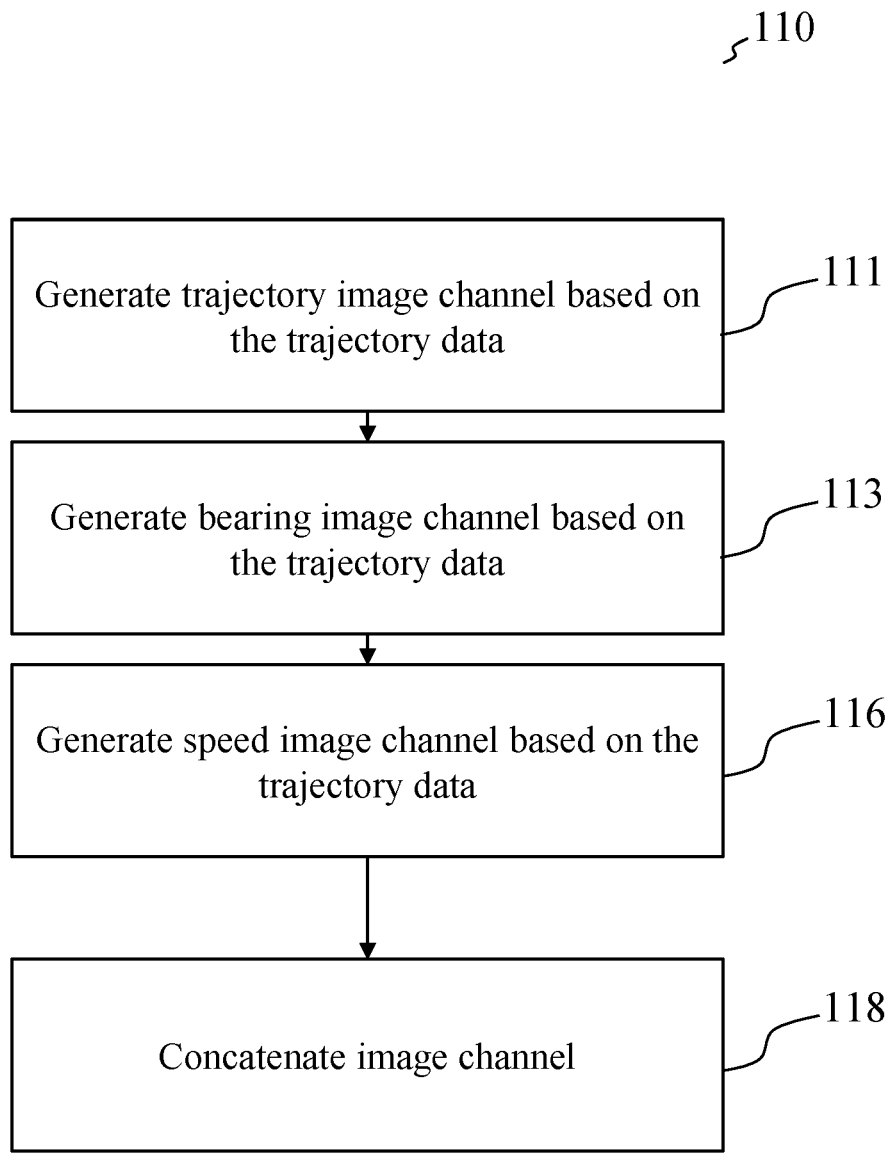
FIG. 3 shows exemplary details of providing trajectory data 110 in the form of a flow chart, in accordance with various embodiments.

FIG. 3 shows exemplary details of providing trajectory data 110 in the form of a flow chart, in accordance with various embodiments. According to various embodiments, calculating one or more image channels 120 based on the trajectory data 30 may include at least one of:

i) calculating a trajectory image channel 111, as part of the one or more image channels 120, based on the trajectory data 30;

ii) calculating a bearing image channel 113, as part of the one or more image channels 120, based on the trajectory data 30;

iii) calculating a speed image channel 116, as part of the one or more image channels 120, based on the trajectory data 30. According to various embodiments, the method 100 may include all of i), ii), and iii).

According to various embodiments, the method 100 may include concatenating 118 the trajectory image channel, the bearing image channel, and the speed image channel into a concatenated trajectory image 34 before classifying 130 the road segment 12. According to various embodiments, calculating the trajectory image channel 111 may include assigning a count of the number of trajectory points, e.g., GPS points, of the trajectory data 30 that may be projected onto each pixel of a matrix of pixels onto that pixel.

Figure 4:
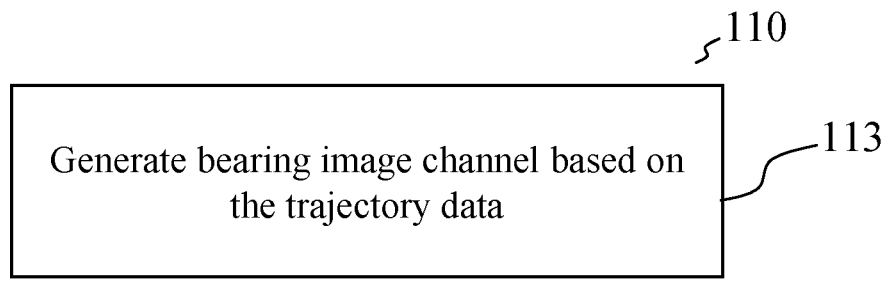
FIG. 4 shows exemplary details of calculating a bearing image channel 113 in the form of a flow chart, in accordance with various embodiments.

FIG. 4 shows exemplary details of calculating a bearing image channel 113 in the form of a flow chart, in accordance with various embodiments. According to various embodiments calculating a bearing image channel 113 may include providing a multichannel bearing image including multichannel pixels, wherein the number of channels represents a number of bearing bins, and quantizing bearing values, e.g., by degree, into the bearing bins forming a bearing histogram for each of the multichannel pixels.

Figure 5:
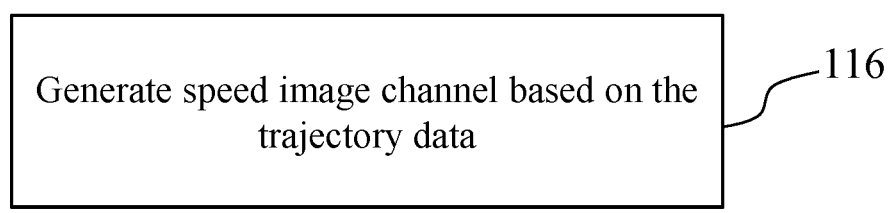
FIG. 5 shows exemplary details of calculating a speed image channel 116 in the form of a flow chart, in accordance with various embodiments.

FIG. 5 shows exemplary details of calculating a speed image channel 116 in the form of a flow chart, in accordance with various embodiments. According to various embodiments, calculating a speed image channel 116 may include providing a multichannel speed image including multichannel pixels, wherein the number of channels represents a number of speed bins, and quantizing speed values, e.g., in m/s, into the speed bins forming a speed histogram for each of the multichannel pixels.

Figure 6:
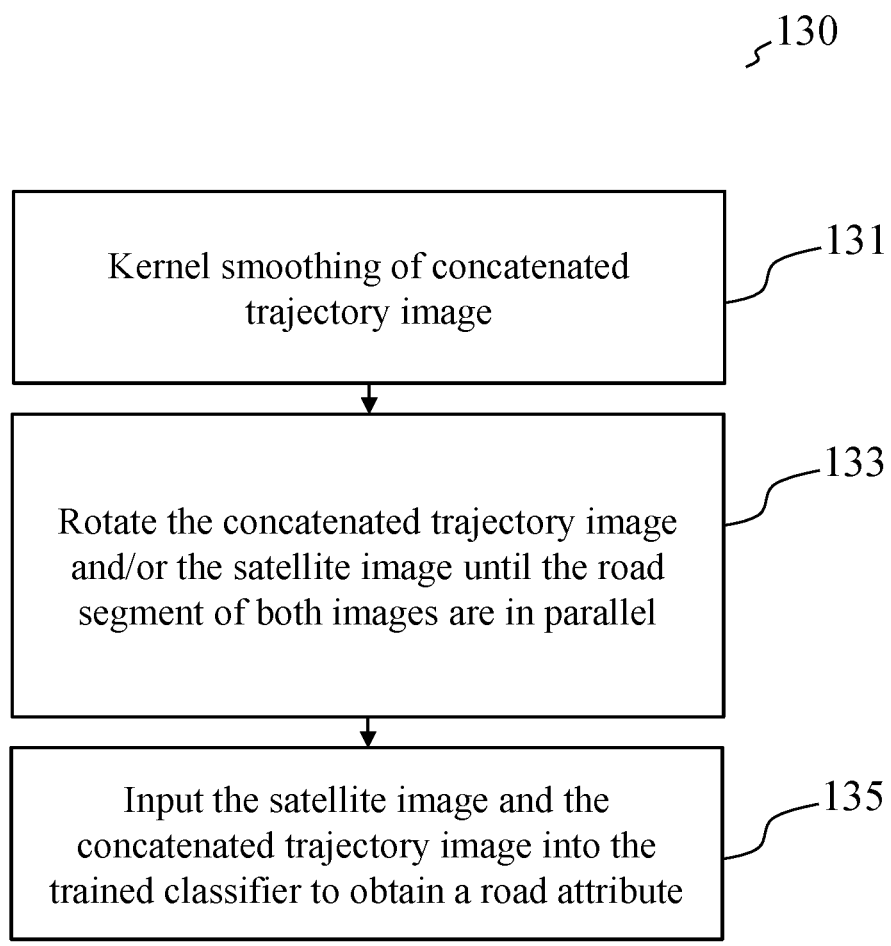
FIG. 6 shows exemplary details of data pre-processing before classifying 130 the road segment 12, in the form of a flow chart, in accordance with various embodiments.

FIG. 6 shows exemplary details of data pre-processing before classifying 130 the road segment 12, in the form of a flow chart, in accordance with various embodiments. According to various embodiments, the method 100, may further include applying a smoothing filter 131 on the concatenated trajectory image 34 before classifying 130 the road segment 12. According to various embodiments, the method 100, may further include applying image rotation 133 until the road segment 12 in the concatenated trajectory image 34 may be aligned with the road segment 12 in satellite image 40 before classifying 130 the road segment 12.

Figure 7:
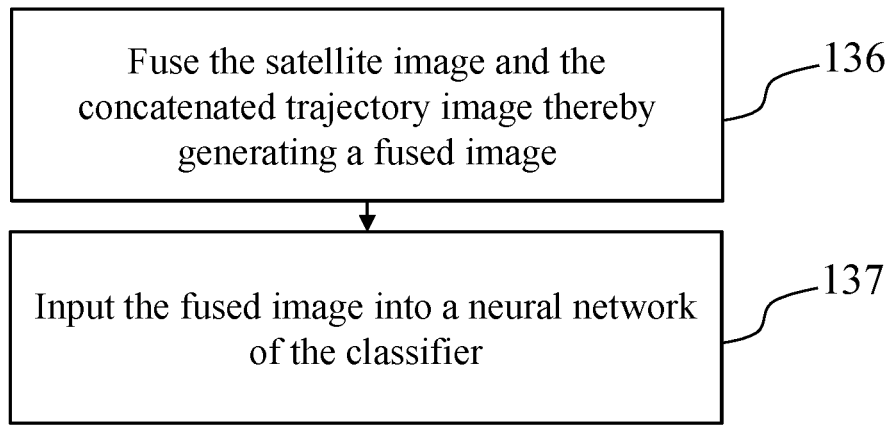
FIG. 7 shows a flowchart of inputting data into the trained classifier when using early fusion.

FIG. 7 shows a flowchart of inputting data into the trained classifier when using early fusion. According to various embodiments, classifying may include fusing 140 the satellite image 40 and the concatenated trajectory image 34 into a fused image and input the fused image in a neural network stream of the trained classifier 61, for example in a single neural network stream.

Figure 8:
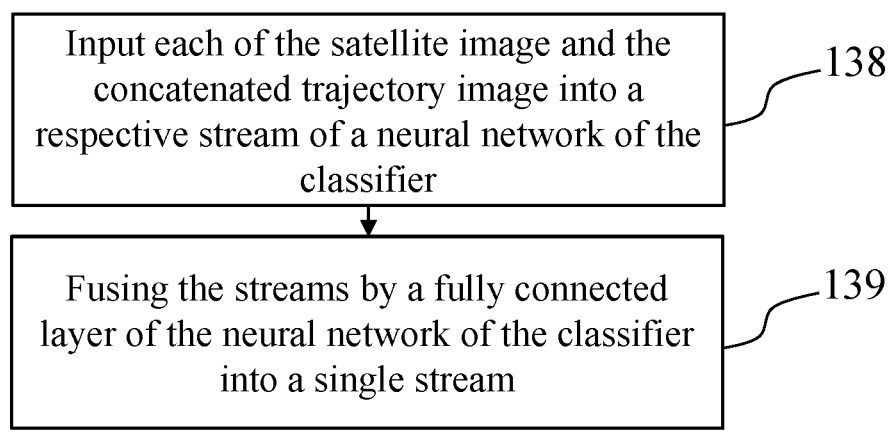
FIG. 8 shows a flowchart of inputting data into the trained classifier when using late fusion.

FIG. 8 shows a flowchart of inputting data into the trained classifier when using late fusion. According to various embodiments the trained classifier 61 may include:

a trajectory neural network stream S1;

a satellite image neural network stream S2;

a fully connected layer FC1 for receiving input from the trajectory neural network stream Si and the satellite image neural network stream S2 and outputting a fused stream FS1. The classifying may include inputting the concatenated trajectory image 34 into the trajectory neural network stream S1, and inputting the satellite image 40 in the satellite image neural network stream S2. According to various embodiments the trajectory neural network stream S1 may be configured to process a multiple trajectory images of the same geographical area 10 including different times, wherein the multiple trajectory images may include the concatenated trajectory image 34. In examples, the trajectory neural network stream S1 may be configured as a Convolutional Recurrent Neural Network CRNN or a 3D Convolutional Neural Network.

Figure 9:
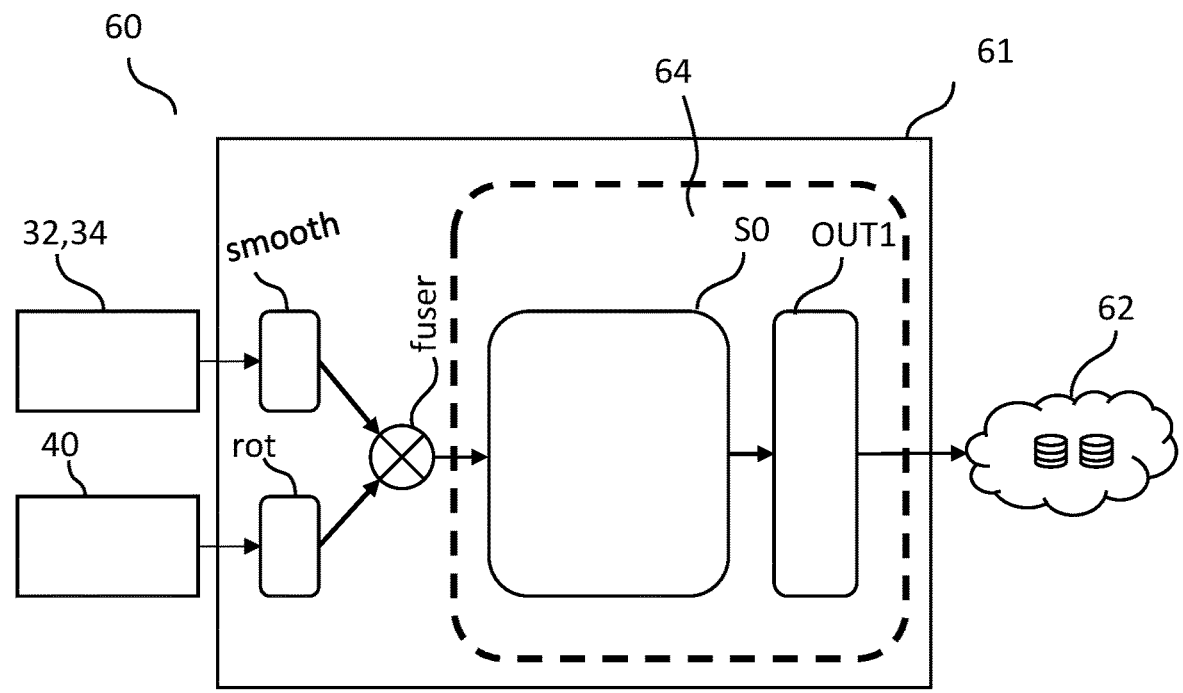
FIG. 9 shows one example of a structure of the classifier for early fusion in accordance with some embodiments.
Figure 10:
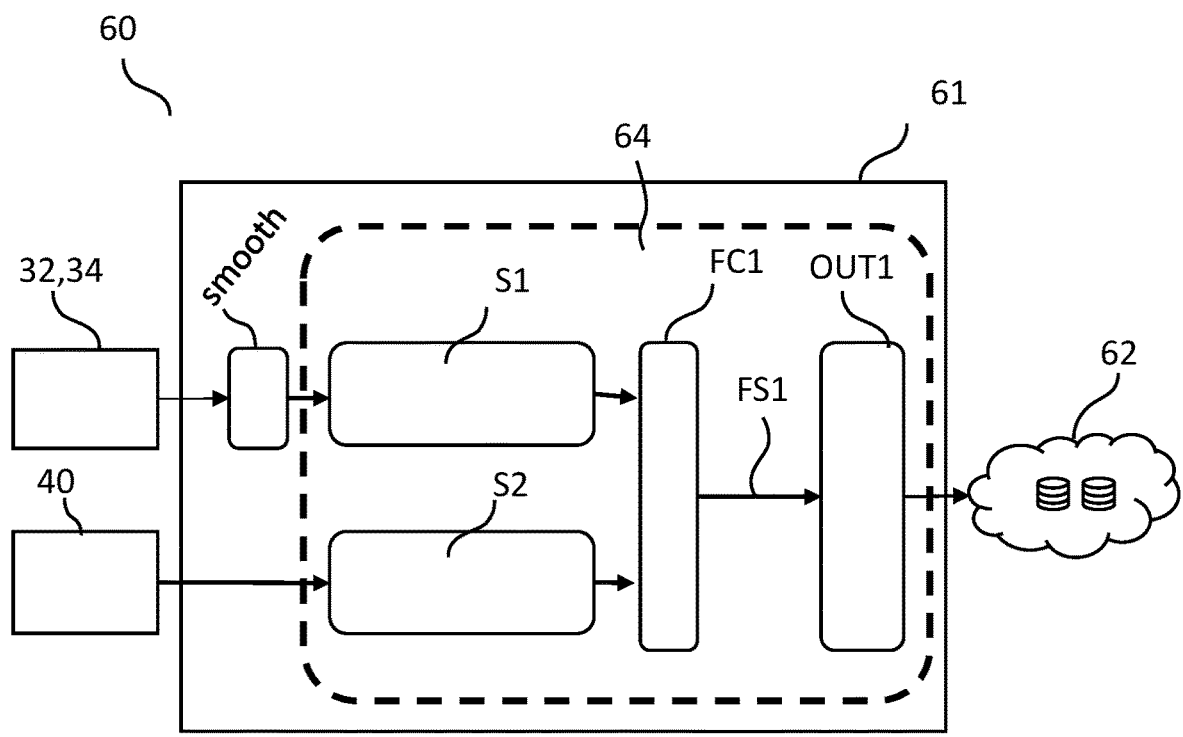
FIG. 10 shows one example of a structure of the classifier for late fusion in accordance with some embodiments.

According to various embodiments, a data processing system 60, including one or more processors, may include a first memory configured to store trajectory data 30 of the geographical area 10, for which examples are illustrated in FIGS. 9 to 10. The data processing system 60 may include a second memory configured to store a satellite image 40 of the geographical area. The data processing system 60 may include a processor configured to calculate one or more image channels 120 based on the trajectory data 30. The data processing system 60 may include a classifier 61 including a neural network configured to predict road attributes 20 based on the one or more image channels 32 and the satellite image 40. The classifier 61 may be a trained classifier. The classifier 61 may include an output layer configured to provide (e.g. to calculate) the prediction probabilities of the road attributes 20. The prediction probabilities may be stored, for example in a database 62. In another example, the prediction probabilities may be used to update map data stored in a database, e.g., database 62.

FIG. 9 shows one example of a structure of the classifier for early fusion in accordance with some embodiments.

According to various embodiments, the method 100 of any of the previous claims wherein the trained classifier 61 may include a Convolutional Neural Network (CNN). For example, the CNN may be selected from:

a Dense Convolutional Network including a plurality of layers, wherein each layer of the plurality of layers may be feed-forward connected to every other layer, for example, DenseNet;

a Convolutional Neural Network including a plurality of convolutional layers followed by fully connected layers, wherein pooling of outputs of neighboring groups of neurons may be performed with overlap, for example AlexNet;

a Convolutional Neural Network, configured to process a plurality of layers via depthwise convolution and pointwise convolution, for example MobileNet.

According to various embodiments, the one or more image channels 32 may include at least two image channels, and wherein the data processing system 60 may be configured to concatenate 118 the one or more image channels 32 into a concatenated trajectory image 34 before classifying 130 the road segment 12. FIG. 9 shows the optional rotation "rot" of the satellite image 40, alternatively or in addition, the rotation may be applied to the one or more image channels 32 (or the concatenated trajectory image 34). FIG.

9 also shows the optional smoothening ("smooth") of the concatenated trajectory image 34.

According to some embodiments, as exemplified by FIG. 9, the classifier 61 may be configured to fuse ("fuser") the satellite image 40 and the concatenated trajectory image 34 into a fused image and input the fused image in a neural network stream of the trained classifier 61. The neural network may include a neural network stream S0, for example, a single neural network stream. The classifier 61 may include an output layer "OUT1" configured to provide (e.g. to calculate) the prediction probabilities of the road attributes 20. The prediction probabilities may be stored, for example in a database 62. In another example, the prediction probabilities may be used to update map data stored in a database, e.g., database 62.

FIG. 10 shows one example of a structure of the classifier for late fusion in accordance with some embodiments.

According to some embodiments, the trained classifier 61 may include a trajectory neural network stream S1. The trained classifier may include a satellite image neural network stream S2. The trained classifier may include a fully connected layer FC1 for receiving input from the trajectory neural network stream Si and the satellite image neural network stream S2 and outputting a fused stream FS1. FIG. 10 also shows the optional smoothening ("smooth") of the concatenated trajectory image 34. Fusion of the trajectory neural network stream Si with the satellite image neural network stream S2 occurs latter within the neural network at the fully connected layer FC1. The fully connected layer FC1 may be, but is not limited to be, the first fully connected layer of the neural network. The classifier may be configured to classify when the concatenated trajectory image 34 is input into the trajectory neural network stream S1, and the satellite image 40 is input in the satellite image neural network stream S2.

The classifier 61 may include an output layer "OUT1" configured to provide (e.g. to calculate) the prediction probabilities of the road attributes 20. The prediction probabilities may be stored, for example in a database 62. In another example, the prediction probabilities may be used to update map data stored in a database, e.g., database 62.

Figure 11:
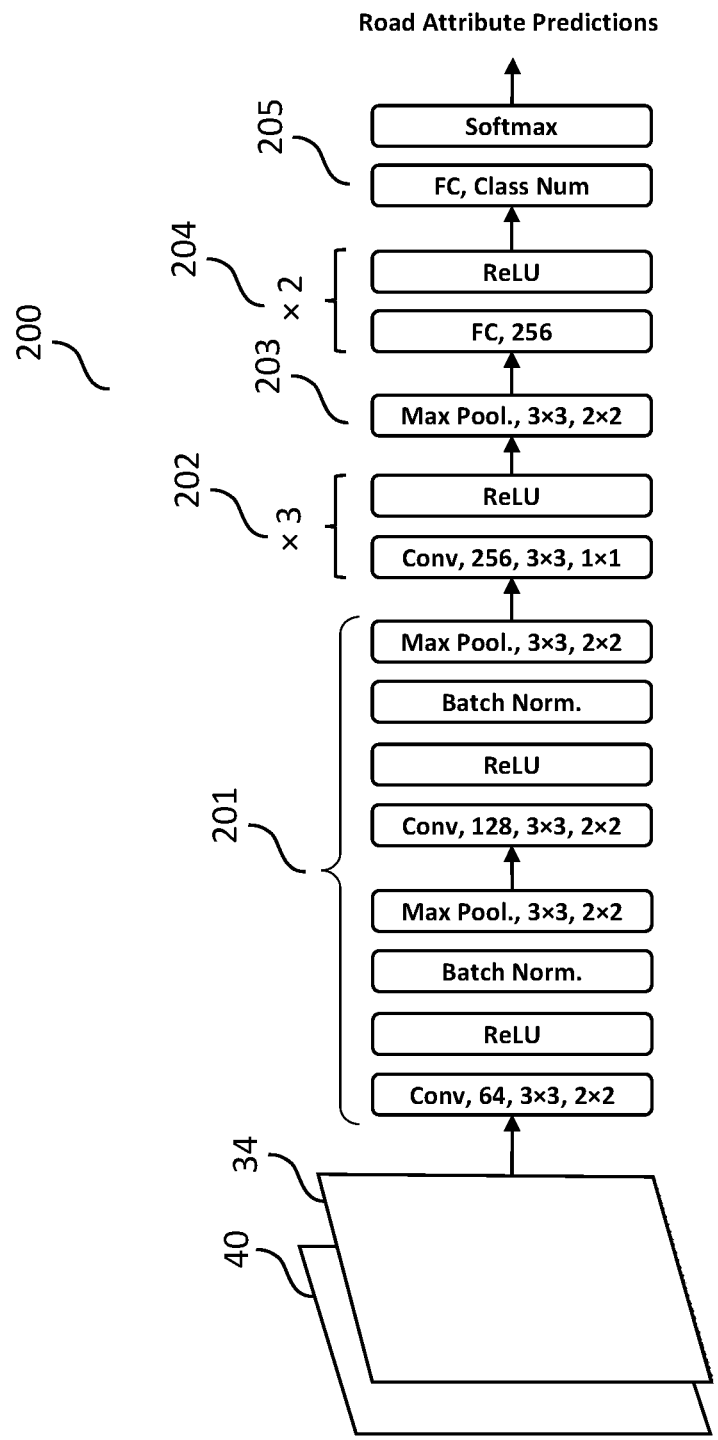
FIG. 11 shows one exemplary classifier structure in accordance with various embodiments.

FIG. 11 shows one exemplary classifier structure 200, in accordance with some embodiments, for early fusion. According to some embodiments, the classifier 200, which may be a trained classifier, may include a first group 201, e.g., including 2 first convolutional layers ("Cony, 64, 3×3, 2×2" and "Cony, 128, 3×3, 2×2"), which may be followed by a second group 202. The classifier 200 may include the second group 202, e.g., including 3 second convolutional layers ("Cony, 128, 3×3, 2×2"), which may be followed by a max pooling layer (203, "Max Pool., 3×3, 2×2"). The classifier 200 may include the max pooling layer, which may be followed by a third group 204. The classifier 200 may include the third group 204, which may include 2 fully connected layers ("FC, 256"), which may be followed by an output layer 205. The classifier 200 may include the output layer 205. Each convolutional layer of the first group 201 and the second group 202 may be followed by a respective activation unit, for example ReLU, which activation unit may be followed by a batch normalization layer and a max pool layer. Each convolutional layer of the second group 202 may be followed by a respective activation unit, for example, ReLU. Each fully connected layer of the third group 204 may be followed by a respective activation unit, for example, ReLU. The output layer 205 may be further processed with softmax pooling layer ("Softmax"). While a detailed layer structure and layer configuration is shown, the disclosure is not limited thereto. For example, other activation units, other number of layers, and other layer's configuration (such as number of neurons) may be used.

According to some embodiments the classifier 61, which may be the trained classifier, may include a Convolutional Neural Network (CNN). The CNN may be, e.g., selected from: a Dense Convolutional Network including a plurality of layers, wherein each layer of the plurality of layers may be feed-forward connected to every other layer (DenseNet); a CNN including a plurality of convolutional layers followed by fully connected layers, wherein pooling of outputs of neighboring groups of neurons may be performed with overlap (AlexNet); a CNN configured to process a plurality of layers via depthwise convolution and pointwise convolution (MobileNet).

Various embodiments may relate to a computer executable code and/or to a non-transitory computer-readable medium storing the computer executable code including instructions for extracting road attributes according to the method of predicting one or more road attributes in accordance with various embodiments.

According to various embodiments, a data processing system may include one or more processors configured to carry out the method of predicting road attributes. The data processing system may be implemented in a computer. The data processing system may include a first memory configured to store trajectory data of the geographical area. For example, the trajectory data may be obtained from a server via a JavaScript Object Notation (JSON) request. The processing system may include a second memory configured to store satellite image, wherein the satellite image may include image data of the geographical area. For example, the satellite images may be stored in a server providing local and/or global digital maps, e.g., which may be accessed by a location. The processing system may include a satellite image extractor which may, e.g., crop map images to a pre-determined required size and/or for a pre-determined location (e.g. centered at a road segment). The processing system may include a classifier configured to predict road attributes based on trajectory data and satellite image, in accordance with various embodiments. The classifier may include a neural network.

According to some embodiments, the trajectory neural network stream S1 may be configured to process multiple trajectory images of the same geographical area 10 including different times, wherein the multiple trajectory images may include the concatenated trajectory image 34. For example, each image of the multiple trajectory images may have a different timestamp, thus the multiple trajectory images may have a time axis. In some embodiments, the trajectory neural network stream S1 may be configured as a Convolutional Recurrent Neural Network CRNN or a 3D Convolutional Neural Network.

Various embodiments also relate to a method for training the classifier, or for training an automated road attribute predictor including the classifier. The method for training may include performing forward propagation by inputting training data into the automated predictor to obtain an output result, for a plurality of road segments 12 of a geographical area 10, wherein the training data includes trajectory data 30 and satellite image 40 having an electronic image format. The method for training may include performing back propagation according to a difference between the output result and an expected result to adjust weights of the automated predictor. The method for training may include repeating the above steps until a pre-determined convergence threshold may be achieved. The automated predictor may include the classifier 400 configured to provide the prediction probabilities of the road attributes 20. The classifier may include a neural network configured to predict road attributes 20 based on one or more image channels 32 and satellite image 40, wherein the one or more image channels 32 may be calculating based on the trajectory data 30.

Figure 12A:
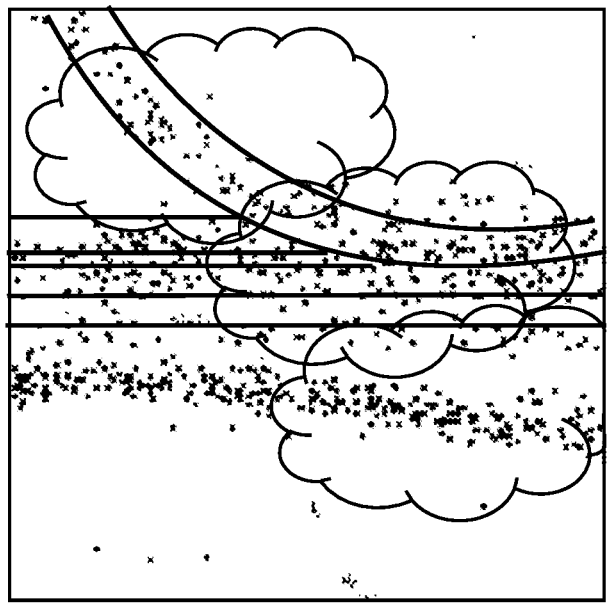
FIGS. 12A and 12B shows illustration of the challenges for road attribute detection using only one of satellite images or GPS traces alone.
Figure 12B:
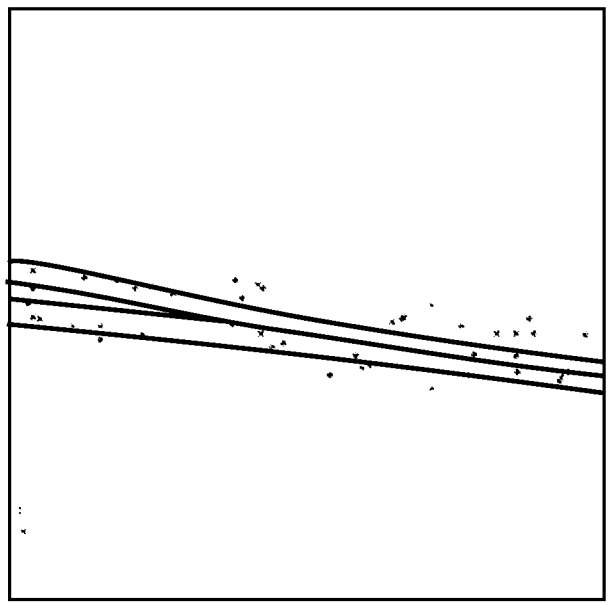

FIGS. 12A and 12B shows illustration of the challenges for road attribute detection using only one of satellite images or GPS traces alone. In FIG. 12A, a satellite image is shown with heavy clouds that interfere with the visibility of the roads. In FIG. 12B, sparse GPS samples makes it more difficult to identify a narrow road.

Figure 13A:
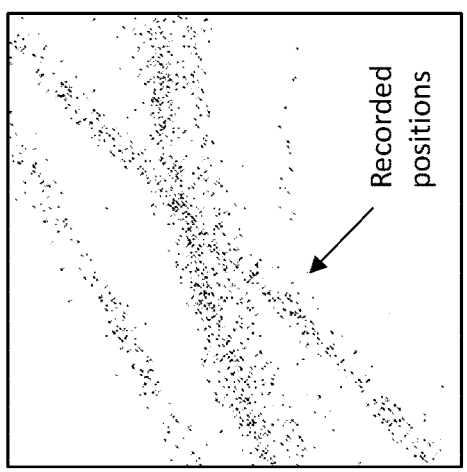
FIGS. 13A to 13C show GPS rendering results after applying kernel smoothing.
Figure 13B:
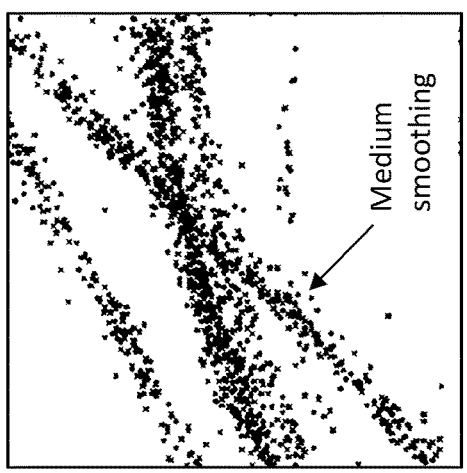
Figure 13C:
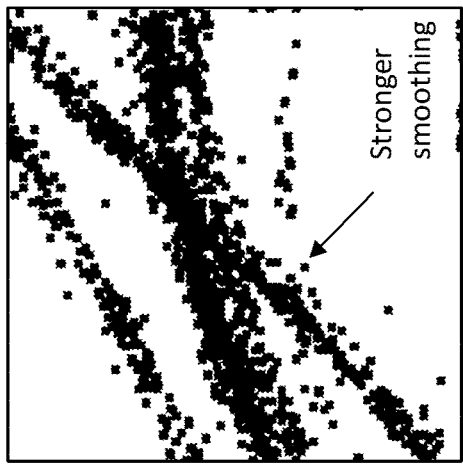

As shown in FIG. 13A, with a high rendering resolution at 0.6 m/pixel, the projection of the original trajectory points around a road segment $r_i$ can be noisy and sparse. This can be improved by smoothing each channel of $G_i$ by computing the moving average over a square kernel with size K. FIG. 13B shoes the rendering of the smoothed GPS traces with K=3, and FIG. 13C shoes the rendering of the smoothed GPS traces with K=5.

Figure 14:
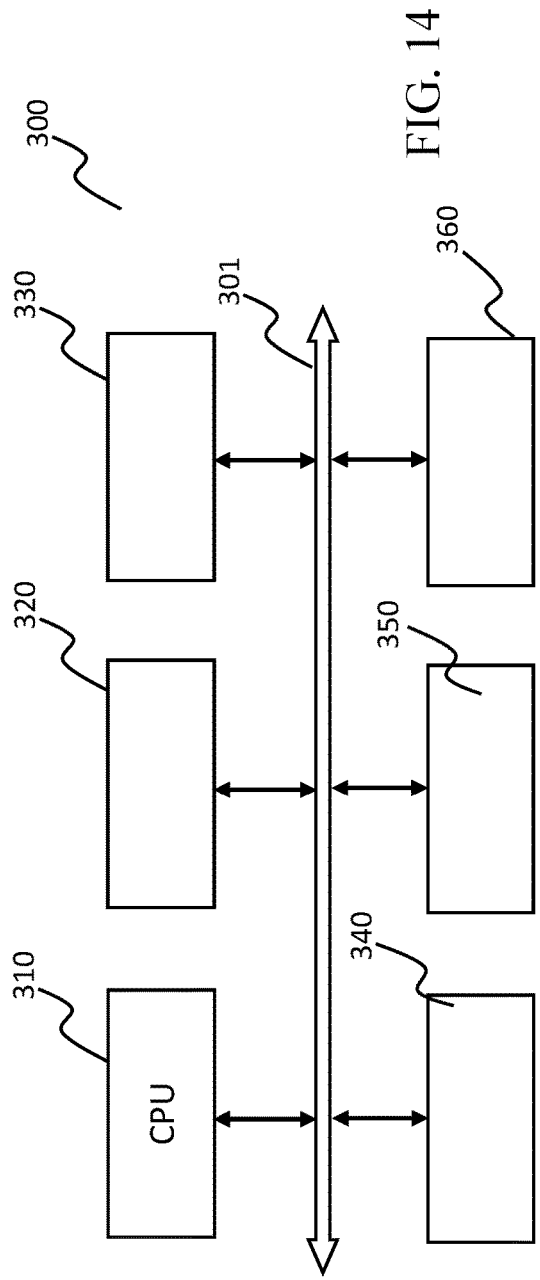
FIG. 14 shows the architecture of an exemplary computer 300, which may be used in accordance with various embodiments

FIG. 14 shows the architecture of an exemplary computer 300, which may be used in accordance with various embodiments to carry out the method of predicting road attributes, the method for training the classifier, and/or to implement the data processing system. The computer 300 includes a bus 301 through which one or more of the devices may communicate with each other. In the example of FIG. 17, the following devices are shown connected to the bus 301: a CPU 310; a main memory 320, for example a RAM; a storage device 330, for example a hard disk drive, a solid state drive, a flash drive; a communication device 340, for example for wired or wireless communication, e.g. WiFi, USB, Bluetooth; a display interface 332, and other user interfaces 360, for example for user input; however the disclosure is not limited thereto, and more or less devices may be included in the computer and the computer and/or bus may have other architectures than the one illustrated.

Various embodiments relate to a non-transitory computer-readable medium storing computer executable code including instructions for predicting one or more road segment attributes according to the method of predicting one or more road segment attributes. Various embodiments relate to a computer executable code including instructions for predicting one or more road segment attributes according to the method of predicting one or more road segment attributes. The computer executable code may be executed, e.g., in the above described computer architecture.

In the following examples, an exemplary experimental setup is explained, and then examples of the method for road attribute detection are evaluated. The effectiveness of the satellite images, trajectory data, and their fusion in the detection of road attributes is determined. Examples of road attributes are one-way/two-way road, number of lanes, speed limit, and road type. Examples of road types are "Residential", "Service", and "Footway", "Primary", "Secondary", and "Tertiary". For below experiments, a same input size and resolution for the images generated from different data sources is used for determining the effectiveness of both early fusion and late fusion strategies. Next, an ablation analysis is performed on the settings of bin number and kernel size for trajectory feature generation and smoothing to verify the design disclosed herein. Finally, the multimodal model is integrated into three state-of-the-art network architectures to demonstrate its effectiveness in road attribute detection.

Two large-scale real-world datasets of Singapore and Jakarta are used for the examples below. To prepare the datasets, the ground-truth labels are derived of four road attributes, namely one-way/two-way road, number of lanes, speed limit, and road type, from the OpenStreetMap data. The road segments without ground-truth labels are removed and the remaining dataset is divided into 80%-20% splits for training and testing. The number of training and testing samples in each category (i.e., each road attribute) is illustrated in the table of FIG. 15. There is shown one row for the Singapore dataset and one row for the Jakarta dataset, and four columns, showing, for each dataset, the training/testing dataset size for the attributes of one/two way, number of lanes, speed limit, and road type.

As only a few roads in Jakarta are annotated with the speed limit label no speed limit detection was performed on the Jakarta dataset. For feature extraction, satellite imagery is used (e.g., DigitalGlobe) and real-world trajectory traces of in-transit drivers in Singapore and Jakarta (e.g., GPS traces of Grab drivers). For comparison, the overall classification accuracy and the per-class F-measure are reported as the evaluation metrics.

FIG. 16 shows a table with the results for (a) Singapore and for (b) Jakarta, of classification accuracy obtained based on satellite images only, trajectory data only, early fusion of satellite images and trajectory data, late fusion of satellite images and trajectory data at the first fully connected layer FC1 (refer to FIG. 11, the first FC of group 204), and late fusion of satellite images and trajectory data at the second fully connected layer FC2 (refer to FIG. 11, the second FC of group 204), with the best result highlighted (bold) in each column. In the comparison, early fusion refers to concatenating the RGB channels of the satellite images and the location, bearing, and speed channels of the GPS traces at the input layer and a classifier architecture as described in FIG. 11 was used. While late fusion refers to processing satellite images and GPS traces with two separate network streams first and fusing the two networks at a later point by concatenating the features outputted by the FC1 or FC2 layers, a classifier architecture as described in FIG. 11 was used with the modification that the input streams are separated until the respective fusion takes place at FC1 or FC2. In this experiment, the number of bins to generate the bearing and speed channels from GPS traces were set to $M_b=2$ and $M_s=3$, respectively. The kernel size for GPS smoothing was set to 9×9. The tuning of these parameters will be evaluated and discussed further below.

Comparative classifiers trained on satellite images or GPS traces alone have their own limitations. For example, the visibility of roads may not always be good due to occlusions caused by trees, buildings, or even heavy clouds in a satellite image. The crowdsourced trajectory traces, on the other hand, contain intrinsic noise resulting in incorrectly placed trajectory points off the road. That classifiers trained in Singapore performed better than those trained in Jakarta is attributed to a quality of the Singapore dataset being better as the number of roads with ground-truth labels in each category is much higher than that in Jakarta, and, it is theorized that Singapore tends to have well-structured road networks that might be easier to be recognized. Due to the alignment of the satellite images and trajectory traces in the geospatial space (rotation to alignment or rotation to horizontal as disclosed herein), early fusion is able to learn the pixel-wise correspondences from them, therefore, on both datasets, early fusion outperformed late fusion in most of the cases. Comparatively, late fusion generally performed slightly worse than early fusion. However, late fusion has the flexibility that the method (and classifier) can be extended from the current trajectory data rendering of 2D to 3D (adding a time axis), where different network architectures may be used to process satellite images and GPS traces separately. The early fusion approach significantly improved the classification accuracy compared to the individual classifiers trained on satellite images and GPS traces separately. On the road type detection, the classification accuracy has been improved by 9.8% to 14.3%, which demonstrates the effectiveness of our proposed approach.

Figure 17A:
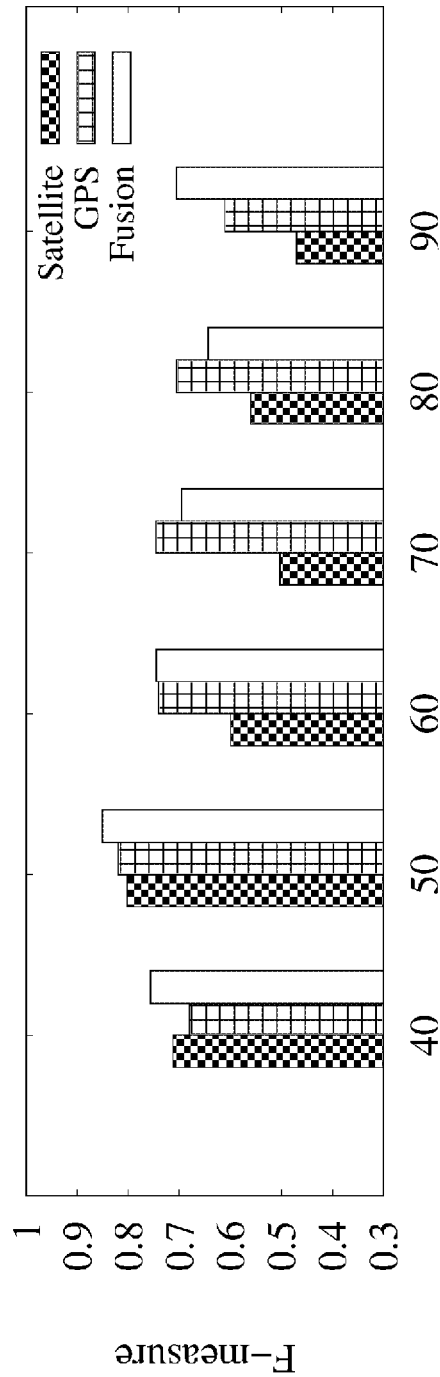
FIGS. 17A to 17B shows exemplary results of per-class F1 measure of road attribute detection based on satellite images, GPS traces, and their fusion on the speed limit and road type detection.
Figure 17B:
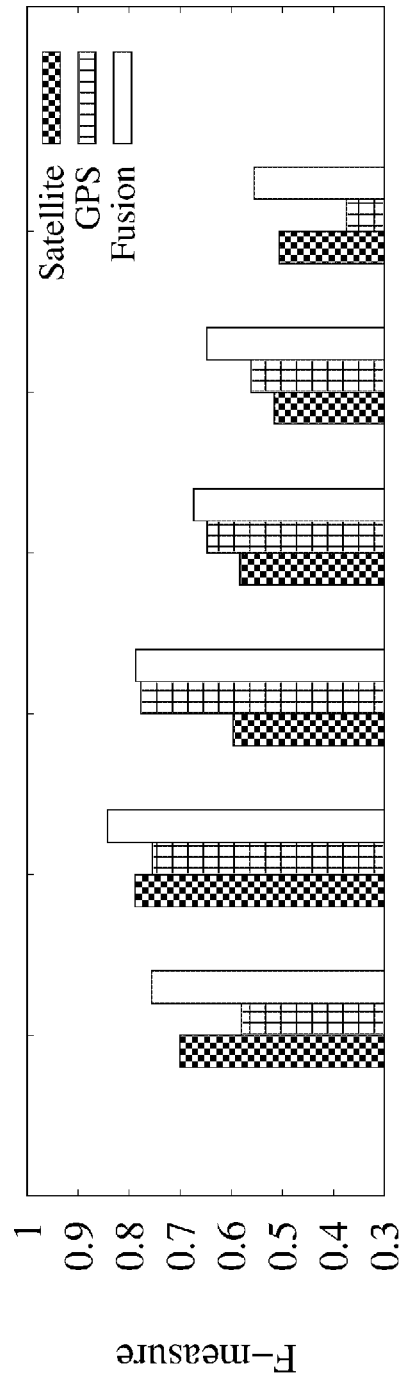
Figure 18:
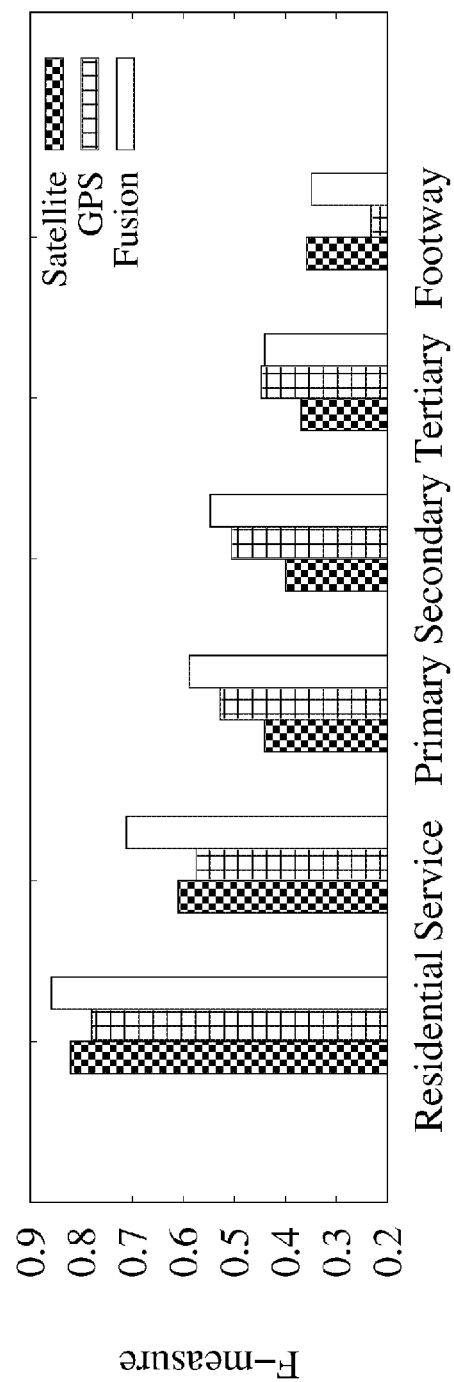
FIG. 18 shows exemplary results of per-class F1 measure of road attribute detection based on satellite images, GPS traces, and their fusion on the road type detection for Jakarta.

FIGS. 17A to 17B shows exemplary results of per-class F1 measure of road attribute detection based on satellite images, trajectory traces (in this example, GPS), and their fusion (using early fusion) on the speed limit and road type detection. FIG. 17A shows the speed limit and FIG. 17B shows the road type for data sample of Singapore. FIG. 18 shows exemplary results of per-class F1 measure of road attribute detection based on satellite images, GPS traces, and their fusion on the road type detection for Jakarta.

The per-class F-measure comparison of the classifiers trained based on satellite images, trajectory traces, and their early fusion is shown in FIGS. 17A, 17B and 18. F-measure is computed as 2·((precision·recall)/(precision+recall)), which considers both precision and recall. For speed limit detection, the trajectory data (in the example, GPS) based classifier outperformed the satellite image based classifier in most of the cases except the class of 40 km/h. This is believed to be because the trajectory traces contain vehicle's bearing and speed information, which is missing from the satellite images. Satellite images provide additional information for road attribute detection. For road type detection, the satellite image based classifier performed better on classes of "Residential", "Service", and "Footway", while the trajectory based classifier performed better on classes of "Primary", "Secondary", and "Tertiary". The same trend shows on both Singapore dataset and Jakarta dataset. This is because the contextual information in a satellite image shows the surrounding environment around a road. Thus, the satellite image helps with the detection of certain road types such as residential roads that are around residential areas and service roads that are for access to parking, driveways, and alleys. On the other hand, classes of "Primary", "Secondary", and "Tertiary" define the most, the second most, and the third most important roads in a country's road network system. Both the number of vehicles travelled on these roads and the quality of the corresponding trajectory traces tend to be high. So the trajectory based classifier tends to recognize such road types more easily.

Figure 19A:
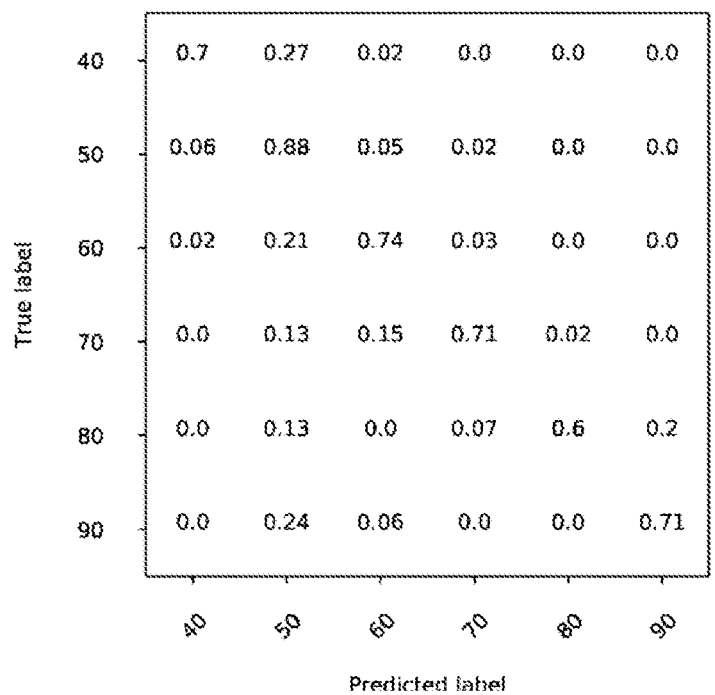
Figure 19B:
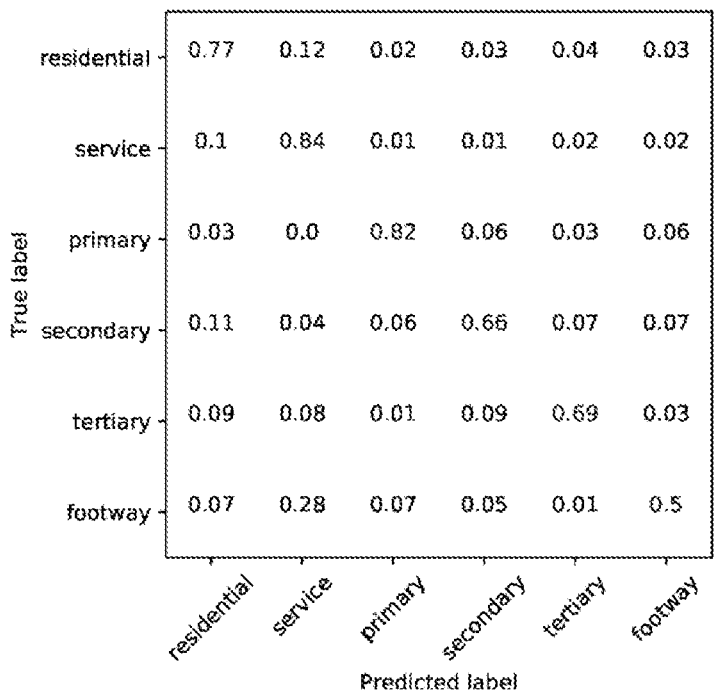

FIGS. 19A to 19C show exemplary normalized confusion matrices of the method of predicting one or more road segment attributes in accordance with various embodiments. The vertical axis represents the true label and the horizontal axis represents the predicted label. FIG. 19A shows the confusion matrix for the speed limit for Singapore. FIG. 19B shows the confusion matrix for the road type detection for Singapore. And FIG. 19C shows the confusion matrix for the road type prediction for Jakarta. The six speed classes (also named as speed limit classes) chosen are 40, 50, 60, 70, 80, and 90 km/h. For the speed limit detection, the number of test samples for the six classes are 415, 1075, 299, 102, 15, and 17, respectively. We can see that most confusions are between common and rare classes. Due to the class imbalance, the detection of samples from rare classes is more challenging as the classifier tends to favor the majority class. For road type detection, the classifiers trained in both Singapore and Jakarta can recognize "Residential" and "Service" roads easily. "Primary", "Secondary", and "Tertiary" roads can be recognized more easily in Singapore than in Jakarta.

An ablation analysis on the key parameter settings in the trajectory data rendering. The impact of the number of bins/channels $M_b$ and $M_s$ that are used to render the sensor data into images are studied and the results shown in the table of FIG. 20. The first row reports the classification accuracy obtained by training with trajectory (in the example, GPS) locations only, which serves as a baseline when other sensor data is not available in the GPS traces. As previously explained, the GPS locations are rendered into a single-channel image GL that captures the spatial distribution of the GPS points by counting the number of GPS points that are projected onto each pixel. Comparatively, the $M_b$-channel image GB and the $M_s$-channel image GS rendered from bearing and speed tend to be more descriptive as they capture not only the spatial distribution of the GPS points, but also the local distribution of vehicles' moving direction and speed at each pixel. By comparing the results shown in rows 2 to 4, it can be seen that improved classification accuracy can be obtained by increasing the number of channels $M_b$ and $M_s$ especially for the detection of speed limit and road type. The last row in the table shows the classification accuracy obtained by training based on the fusion of GL, GB, and GS, where the input G=Concat((GL, GB, GS), axis=−1). As features extracted from GPS location, bearing, and speed capture complementary information, the classifier trained on 7-channel G outperformed the classifier trained on 7-channel GB or 7-channel GS in the six out of the seven cases.

The results of a study of the impact of the kernel size adopted for GPS smoothing is shown in the table of FIG. 21. The kernel size is set to 1×1, 3×3, 5×5, 7×7, 9×9, and 11×11 and the results are reported in FIG. 21. The advantages of applying kernel smoothing to GPS traces are twofold. First, it helps reduce the negative impact caused by sensor noise. Second, crowdsourced GPS traces can be sparse in some regions where pixels on a road can have no GPS points projected to it, especially when we render at a high resolution. As FIG. 21 shows, classifiers trained with smoothed GPS traces outperformed the classifiers trained with the original GPS traces by a large margin. The kernel size of 9×9 is considered to be a good choice based on the experimental results on the used datasets, and this kernel size is used as exemplary setting in the experiments herein.

The disclosed multimodal fusion solution of road features from satellite images and GPS traces can be easily integrated with any existing network architectures to train an end-to-end classifier for road attribute detection. To demonstrate the effectiveness, the baseline network (FIG. 11) was replaced by a number of state-of-the-art image classification architectures including AlexNet, MobileNet, and DenseNet. The table in FIG. 22 reports the classification accuracy based on different combinations of input modules and model architectures on the Singapore dataset. The size of the AlexNet is similar to the baseline network, both of which consist of five convolutional layers followed by ReLU activations. AlexNet adopted a kernel size of 11×11 and 5×5 respectively in the first two convolutional layers, which is the biggest among the four models. Comparatively, MobileNet and DenseNet went much deeper. To improve a model's efficiency, MobileNet factorized a standard 2D convolution into a depthwise convolution and a 1×1 pointwise convolution. DenseNet divided the network into multiple densely connected dense blocks composed of narrow layers, which are connected by transition layers that perform 1×1 convolution and 2×2 average pooling. From the results it can be seen that all models obtained significant performance gain by applying our proposed multimodal fusion solution. For the road attribute detection problem, DenseNet achieved the best classification accuracy based on satellite images, but it performed less robust when dealing with GPS traces. Better results were obtained with multimodal fusion, for the baseline network, MobileNet, and DenseNet, on the detection of the four road attributes.

FIG. 23 shows a table reporting the classification accuracy and the performance gain of the disclosed multimodal feature fusion with calibration (as explained above) compared to the classifiers trained without calibration. By applying both image rotation and bearing adjustment calibrations, the model disclosed herein significantly improved the detection accuracy of the one-way/two-way road and the number of lanes by 6.7% and 6.9%, respectively. For speed limit and road type, the best detection rates were obtained by applying the bearing adjustment calibration only. One possible reason is that the detection of these road attributes partially relies on the features of the surrounding environments. For example, highways in the same downtown area may have similar speed limit and residential roads are always within the residential area. The best classification accuracy obtained by the base model is 90.6%, 74.5%, 83.0%, and 80.7% for one-way/two-way road, number of lanes, speed limit, and road type detection, respectively.

A raw trajectory trace is noisy and does not contain the information of the true route the vehicle travelled. Therefore, traditional GPS-based road attribute detection methods mostly perform map matching algorithms to find the group of traces that are associated with each road segment in the preprocessing phase. However, the effectiveness of map matching algorithms can be significantly degraded by both low-sampling-rate GPS traces and incomplete road networks, not to mention the huge computational cost when pre-processing a large number of GPS traces. To solve the above issues, it is disclosed herein the method to render trajectory traces as a multi-channel image that can be directly passed to a classifier without applying map matching algorithms. The disclosed trajectory rendering is more efficient than the traditional map matching based road feature extraction methods. Moreover, both the sampling rate of the trajectory traces and the completeness of the map have little impact on the effectiveness of the method in accordance with various embodiments.

A multimodal fusion framework that learns from both satellite images and crowdsourced GPS traces for robust road attribute detection is disclosed herein. Accordingly, a method of predicting one or more road segment attributes, a data processing system, a non-transitory computer-readable medium storing computer executable code, and a method for training an automated road attribute predictor are disclosed herein, among others. In order to learn multimodal pixel-wise correspondences, trajectory traces may be rendered into a multi-channel image that align with satellite images in the spatial domain. Moreover, the trajectory rendering method does not require map matching to preprocess the raw trajectory traces. Thus, the herein disclosed method is less sensitive to the sampling rate of trajectory traces compared to traditional trajectory based road feature extraction methods.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of predicting one or more road attributes corresponding to a road segment in a geographical area, the method comprising:
providing trajectory data and satellite image of the geographical area;
calculating two or more image channels based on the trajectory data;
classifying the road segment based on the two or more image channels and the satellite image using a trained classifier into prediction probabilities of the road attributes; and
concatenating the two or more image channels into a concatenated trajectory image before classifying the road segment,
wherein the classifying the road segment comprises: using the trained classifier, fusing the satellite image and the concatenated trajectory image into a fused image and inputting the fused image in a neural network stream of the trained classifier.

2. The method of claim 1, wherein calculating two or more image channels based on the trajectory data comprises at least two of:
i) calculating a trajectory image channel, as part of the two or more image channels, based on the trajectory data;
ii) calculating a bearing image channel, as part of the two or more image channels, based on the trajectory data;
iii) calculating a speed image channel, as part of the two or more image channels, based on the trajectory data.

3. The method of claim 2, comprising i), ii), and iii).

4. The method of claim 3, wherein calculating the trajectory image channel comprises assigning a count of a number of trajectory points of the trajectory data that are projected onto each pixel of a matrix of pixels onto that pixel.

5. The method of claim 3, wherein calculating the bearing image channel comprises providing a multichannel bearing image comprising multichannel pixels, wherein a number of channels represents a number of bearing bins, and quantizing bearing values into the bearing bins forming a bearing histogram for each of the multichannel pixels.

6. The method of claim 3 or claim wherein calculating the speed image channel comprises providing a multichannel speed image comprising multichannel pixels, wherein a number of channels represents a number of speed bins, and quantizing speed values into the speed bins forming a speed histogram for each of the multichannel pixels.

7. The method of claim 3, comprising concatenating the trajectory image channel, the bearing image channel, and the speed image channel into the concatenated trajectory image before classifying the road segment.

8. The method of claim 7, further comprising applying a smoothing filter on the concatenated trajectory image before classifying the road segment.

9. The method of claim 7, further comprising applying image rotation until the road segment in the concatenated trajectory image is aligned with the road segment in the satellite image before classifying the road segment.

10. The method of any one of claim 7, wherein the trained classifier comprises:

a trajectory neural network stream;
a satellite image neural network stream;
a fully connected layer for receiving input from the trajectory neural network stream and the satellite image neural network stream and outputting a fused stream,
wherein the classifying comprises inputting the concatenated trajectory image into the trajectory neural network stream, and
inputting the satellite image in the satellite image neural network stream.

11. The method of claim 10, wherein the trajectory neural network stream is configured to process a multiple trajectory images of a same geographical area comprising different times, wherein the multiple trajectory images include the concatenated trajectory image.

12. The method of claim 1, wherein the trained classifier comprises a Convolutional Neural Network.

13. The method of claim 12, wherein the trained classifier comprises:
   a first group comprising 2 first convolutional layers, followed by
   a second group comprising 3 second convolutional layers, followed by
   a max pooling layer, followed by
   a third group comprising 2 fully connected layers, followed by
   an output layer;
wherein each convolutional layer of the first group and the second group is followed by an activation unit, and
wherein each fully connected layer of the third group is followed by a respective activation unit.

14. A non-transitory computer-readable medium storing computer executable code comprising instructions for predicting one or more road attributes according to the method of claim 1.

15. A computer executable code comprising instructions for predicting one or more road attributes according to the method of claim 1.

16. A data processing system for predicting one or more road attributes corresponding to a road segment in a geographical area the data processing system comprising:
   a first memory configured to store trajectory data of the geographical area;
   a second memory configured to store a satellite image of the geographical area;
   a processor configured to calculate two or more image channels based on the trajectory data; and
   a trained classifier comprising: a neural network configured to predict the road attributes based on the two or more image channels and the satellite image, and an output layer configured to provide prediction probabilities of the road attributes,
wherein the trained classifier is configured to classify the road segment based on the two or more image channels and the satellite image into the prediction probabilities of the road attributes,
wherein the system is configured to concatenate the two or more image channels into a concatenated trajectory image before classifying the road segment, and
wherein the trained classifier is configured to fuse the satellite image and the concatenated trajectory image into a fused image and input the fused image in the neural network of the trained classifier.

17. The data processing system of claim 16, wherein the trained classifier comprises:
   a trajectory neural network stream;
   a satellite image neural network stream;
   a fully connected layer for receiving input from the trajectory neural network stream and the satellite image neural network stream and outputting a fused stream,
wherein the trained classifier is configured to classify when the concatenated trajectory image is input into the trajectory neural network stream, and the satellite image is input in the satellite image neural network stream.

18. The data processing system of claim 17, wherein the trajectory neural network stream is configured to process multiple trajectory images of a same geographical area comprising different times, wherein the multiple trajectory images include the concatenated trajectory image.

19. The data processing system of claim 16, wherein the trained classifier comprises a Convolutional Neural Network.

* * * * *